United States Patent
Joel et al.

(10) Patent No.: US 10,237,365 B2
(45) Date of Patent: *Mar. 19, 2019

(54) METHOD AND APPARATUS FOR AUTOMATICALLY OPTIMIZING THE LOADING OF IMAGES IN A CLOUD-BASED PROXY SERVICE

(71) Applicant: CLOUDFLARE, INC., San Francisco, CA (US)

(72) Inventors: Christopher Stephen Joel, Oakland, CA (US); Lee Hahn Holloway, Santa Cruz, CA (US); Dane Orion Knecht, San Francisco, CA (US); Albertus Strasheim, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/818,277

(22) Filed: Aug. 4, 2015

(65) Prior Publication Data

US 2015/0341459 A1    Nov. 26, 2015

Related U.S. Application Data

(63) Continuation of application No. 13/894,839, filed on May 15, 2013, now Pat. No. 9,098,477.

(51) Int. Cl.
*H04L 29/08* (2006.01)
*G06F 17/24* (2006.01)
(Continued)

(52) U.S. Cl.
CPC ...... *H04L 67/2823* (2013.01); *G06F 17/2264* (2013.01); *G06F 17/24* (2013.01);
(Continued)

(58) Field of Classification Search
CPC .............. G06F 17/211; G06F 17/2258; G06F 17/2264; G06F 17/248; G06F 17/30905;
(Continued)

(56) References Cited

U.S. PATENT DOCUMENTS 6,578,073 B1    6/2003    Starnes et al.
6,657,647 B1    12/2003    Bright
(Continued)

OTHER PUBLICATIONS

Opera Turbo White Paper, Opera Software, Copyright © 2009 Opera Software ASA, 8 pages.
(Continued)

*Primary Examiner* — Stephen S Hong
*Assistant Examiner* — Ahamed I Nazar
(74) *Attorney, Agent, or Firm* — Nicholson De Vos Webster & Elliott LLP

(57) ABSTRACT

A request for a web page is received at a proxy server. The request originates from a client network application of a client device. The requested web page includes multiple references to multiple images. The proxy server retrieves the requested web page. The proxy server modifies code of the retrieved web page such that the client network application will not, for each one of those images, initially request those images when parsing the page. The proxy server also adds code to the retrieved web page that, when executed by the client network application, causes at least two of the images to be requested with a single request. The proxy server transmits the modified web page to the client device.

22 Claims, 14 Drawing Sheets

(51) Int. Cl.
*G06F 17/22* (2006.01)
*H04L 29/06* (2006.01)
*G06F 17/30* (2006.01)

(52) U.S. Cl.
CPC .. *G06F 17/30861* (2013.01); *G06F 17/30902* (2013.01); *H04L 67/02* (2013.01); *H04L 67/2833* (2013.01); *H04L 67/42* (2013.01)

(58) Field of Classification Search
CPC ......... G06F 17/30908; G06F 17/30902; G06F 17/30861; G06F 17/24; H04L 67/2823; H04L 67/2833; H04L 67/02; H04L 67/42
See application file for complete search history.

(56) References Cited

U.S. PATENT DOCUMENTS

| | | | |
|---|---|---|---|
| 7,012,612 B1 | 3/2006 | O'Neill et al. | |
| 7,240,294 B2 | 7/2007 | Fitzsimons et al. | |
| 7,496,831 B2 | 2/2009 | Dutta et al. | |
| 8,031,972 B2 | 10/2011 | Bhakta et al. | |
| 8,111,944 B2 | 2/2012 | Cheng et al. | |
| 8,117,532 B2 | 2/2012 | Dutta et al. | |
| 8,219,633 B2 | 7/2012 | Fainberg et al. | |
| 8,250,457 B2* | 8/2012 | Fainberg | G06F 17/30902 715/205 |
| 8,280,197 B1 | 10/2012 | Foote et al. | |
| 8,321,533 B2 | 11/2012 | Fainberg et al. | |
| 8,346,889 B1 | 1/2013 | Chiu et al. | |
| 8,356,247 B2 | 1/2013 | Krassner et al. | |
| 8,438,471 B2* | 5/2013 | Thorpe | G06F 17/30899 715/230 |
| 8,495,171 B1 | 7/2013 | Potekhin et al. | |
| 8,856,803 B2 | 10/2014 | Guddanti et al. | |
| 8,880,991 B2 | 11/2014 | Mondal et al. | |
| 8,887,085 B1 | 11/2014 | Cox et al. | |
| 8,935,620 B1 | 1/2015 | Cox et al. | |
| 8,972,860 B2 | 3/2015 | Corbett et al. | |
| 2001/0003823 A1* | 6/2001 | Mighdoll | G06F 3/04892 709/200 |
| 2003/0011631 A1 | 1/2003 | Halahmi | |
| 2003/0058866 A1* | 3/2003 | Kitayama | H04L 12/1881 370/394 |
| 2004/0017393 A1 | 1/2004 | Easwar | |
| 2004/0088375 A1 | 5/2004 | Sethi et al. | |
| 2005/0154781 A1 | 7/2005 | Carlson et al. | |
| 2005/0162670 A1* | 7/2005 | Shuler, Jr. | H04N 1/00408 358/1.2 |
| 2006/0235941 A1* | 10/2006 | Arcas | H04L 67/2823 709/217 |
| 2007/0139698 A1* | 6/2007 | Sato | G06F 3/1219 358/1.15 |
| 2007/0283247 A1 | 12/2007 | Brenneman et al. | |
| 2008/0018658 A1 | 2/2008 | Bruno et al. | |
| 2008/0050035 A1* | 2/2008 | Tsurumi | G06F 3/0486 382/276 |
| 2008/0059886 A1 | 3/2008 | Grossman | |
| 2008/0077501 A1* | 3/2008 | Kamei | G06Q 30/02 705/14.49 |
| 2009/0089422 A1 | 4/2009 | Barger et al. | |
| 2009/0288011 A1* | 11/2009 | Piran | G08B 13/19693 715/720 |
| 2009/0300506 A1 | 12/2009 | Drucker et al. | |
| 2010/0033679 A1* | 2/2010 | Kodama | H04N 1/40012 351/242 |
| 2010/0153495 A1* | 6/2010 | Barger | G06F 17/27 709/203 |
| 2010/0153544 A1 | 6/2010 | Krassner et al. | |
| 2010/0153836 A1 | 6/2010 | Krassner et al. | |
| 2010/0199160 A1 | 8/2010 | Klassen et al. | |
| 2010/0325533 A1* | 12/2010 | Artz | |
| 2011/0010612 A1* | 1/2011 | Thorpe | G06F 17/30899 715/234 |
| 2011/0016376 A1 | 1/2011 | Hinson et al. | |
| 2011/0029899 A1 | 2/2011 | Fainberg et al. | |
| 2011/0113000 A1 | 5/2011 | Marlow | |
| 2011/0125833 A1 | 5/2011 | Persson et al. | |
| 2011/0202847 A1 | 8/2011 | Dimitrov | |
| 2012/0033035 A1* | 2/2012 | Lee | H04N 13/194 348/42 |
| 2012/0066586 A1 | 3/2012 | Shemesh | |
| 2012/0079057 A1* | 3/2012 | Fainberg | G06F 17/30902 709/214 |
| 2012/0194519 A1 | 8/2012 | Bissell et al. | |
| 2012/0284664 A1 | 11/2012 | Zhao | |
| 2013/0151937 A1 | 6/2013 | Weber et al. | |
| 2013/0162911 A1 | 6/2013 | Glen | |
| 2013/0185164 A1 | 7/2013 | Pottjegort | |
| 2013/0208012 A1 | 8/2013 | Ergan et al. | |
| 2015/0341459 A1* | 11/2015 | Joel | G06F 17/2264 709/203 |

OTHER PUBLICATIONS

HTML img Tag, w3schools.com, Jan. 7, 2012, 3 pages.
Non-Final Office Action for U.S. Appl. No. 13/675,977, dated Feb. 5, 2013, 20 pages.
Non-Final Office Action for U.S. Appl. No. 13/675,980, dated Mar. 1, 2013, 17 pages.
Han, et al., Dynamic Adaptation in an Image Transcoding Proxy for Mobile Web Browsing, IEEE Personal Communications, Dec. 1998, pp. 8-17.
Non-Final Office Action for U.S. Appl. No. 13/675,977, dated Jul. 16, 2013, 20 pages.
Final Office Action for U.S. Appl. No. 13/675,977, dated Dec. 13, 2013, 25 pages.
Non-Final Office Action for U.S. Appl. No. 13/675,980, dated Sep. 24, 2013, 18 pages.
Final Office Action for U.S. Appl. No. 13/675,980, dated Apr. 23, 2014, 20 pages.
Non-Final Office Action for U.S. Appl. No. 13/675,977, dated Apr. 22, 2014, 24 pages.
Final Office Action for U.S. Appl. No. 13/675,977, dated Nov. 17, 2014, 27 pages.
Non-Final Office Action for U.S. Appl. No. 13/675,980, dated Dec. 18, 2014, 20 pages.
Abandonment from U.S. Appl. No. 13/675,980 dated Apr. 21, 2016, 2 pages.
Advisory Action from U.S. Appl. No. 13/894,839 dated Aug. 27, 2014, 3 pages.
Final Office Action from U.S. Appl. No. 13/675,980 dated Jul. 14, 2015, 17 pages.
Final Office Action from U.S. Appl. No. 13/894,839 dated Apr. 23, 2014, 12 pages.
Lazy Load Plug in for JQuery, Feb. 6, 2010, 5 pages.
Non-Final Office Action from U.S. Appl. No. 13/894,839 dated Nov. 4, 2014, 9 pages.
Non-Final Office Action from U.S. Appl. No. 13/894,839 dated Oct. 7, 2013, 12 pages.
Non-Final Office Action from U.S. Appl. No. 14/937,799 dated Feb. 1, 2016, 20 pages.
Notice of Allowance for U.S. Appl. No. 13/894,839 dated Mar. 26, 2015, 15 pages.
Notice of Allowance from U.S. Appl. No. 13/675,977 dated Jul. 6, 2015, 13 pages.
Notice of Allowance from U.S. Appl. No. 14/937,799 dated Sep. 26, 2016, 17 pages.
Notice of Allowance from U.S. Appl. No. 14/937,799 dated Jun. 6, 2016, 7 pages.

* cited by examiner

<!-- Raw, active version of the image tag -->

<img class="foo" style="border: 1px solid red;" src="some-image.png">

FIG. 12

<!-- Neutralized version of the image tag -->

<img class="foo" style="display:none;visibility:hidden;" data-cfstyle="border: 1px solid red;" data-cfsrc="some-image.png">

<noscript>
    <img class="foo" style="border: 1px solid red;" src="some-image.png">
</noscript>

FIG. 13 http://example.com/get-all-images?r=http%3A%2F%2Fexample.com%2F1.png&r=http%3A%2F%2Fexample.com%2F2.png&r=http%3A%2F%2Fexample.com%2F3.png

FIG. 14

| JSON LENGTH 4 BYTES | UTF-8 ENCODED JSON BYTELENGTH DETERMINED BY PRECEDING LENGTH VALUE | PNG SIGNATURE 8 BYTES | PNG IMAGE DATA |
| --- | --- | --- | --- |

FIG. 15

METHOD AND APPARATUS FOR AUTOMATICALLY OPTIMIZING THE LOADING OF IMAGES IN A CLOUD-BASED PROXY SERVICE

CROSS-REFERENCE TO RELATED APPLICATIONS

This application is a continuation of application Ser. No. 13/894,839, filed May 15, 2013, which is hereby incorporated by reference.

FIELD

Embodiments of the invention relate to the field of network communication; and more specifically, to automatically optimizing the loading of images in a cloud-based proxy service.

BACKGROUND

Images can be more than half of the data that makes up a typical website. Although there are tools that may automatically reduce the size of the images on behalf of the website owner, many of the images may not be needed for the page as they may never be seen by the user. For example, some pages are longer than the viewport of the device (a window or other viewable area on the screen) and require the user to scroll to view the entire page. An example of such a page is a blog, which typically is a relatively long page with a series of stories, the most recent of which are on top. When the page is loaded, only the images within the viewport (the visible portion of the client window) can be viewed. However, most client network application such as browsers download all of the images on the page before the page is ready. This may slow down page performance and waste bandwidth for images that may never be seen (e.g., if the user does not scroll down to actually view the images that are not on the viewport).

Most client network applications create an image placeholder for each single image that is referenced in a web page. Most images are externally sourced and downloaded by the client network application and are displayed in the location of the corresponding image placeholders. If an image cannot be displayed (e.g., an error occurred when the image was attempted to be downloaded), most client network applications display a broken image or other error display in the location of the corresponding image placeholder.

Image loading by itself does not block client-side scripts (e.g., JavaScript) from executing. However, image loading may block the firing of the 'onload' event. An 'onload' event is typically used within the <body> element of a page and executes a client-side script once a web page has completely loaded all the content including images, script files, style files, etc. One slow image loading can delay the 'onload' event long enough to create user-visible lag in web page rendering.

One technique for responsive image loading includes 'capturing' the Document Object Model (DOM). In this technique, document.write is used in the Head tag of the page to encapsulate all of the subsequent HTML in a Plaintext node. Then the rest of the DOM is parsed as text and feed back to component modules that manipulate it. For example, a component module may convert all image 'src' attributes to a desired value based on the detected properties of the client browser. The manipulated DOM is then passed back to document.write and a fresh document is created from it. Although this technique provides website authors much more control over the way a page is parsed, it essentially co-opts parsing of the DOM from the browser and re-implements it in JavaScript. This can result in unexpected (or even negative) behavioral and performance-related side-effects. It also creates additional execution overhead and it occurs on the browser's user interface (UI) thread. This technique also creates difficulty in examining and debugging because one must consider the implementation of 'capturing' the DOM as well as the considering the underlying browser.

SUMMARY

A method and apparatus for automatically optimizing the loading of images in a cloud-based proxy service is described. In one embodiment, a request is received at a proxy server for a web page, the request originating from a client network application of a client device. The requested web page includes multiple references to multiple images. The proxy server retrieves the requested web page. The proxy server modifies code of the retrieved page such that the client network application will not, for each of the images, initially request those images when parsing the page, and adds code to the retrieved page that, when executed by the client network application, causes at least two of the images to be requested with a single request. The proxy server transmits the modified web page to the client device. The client device receives the modified web page and executes the code that causes a single request for the at least two images to be transmitted. In one embodiment, two or more images are requested by the client in a single request and returned to the client in a degraded form (a form that is a smaller file size than the original file size). The full quality counterparts of the images may be subsequently requested.

BRIEF DESCRIPTION OF THE DRAWINGS

The invention may best be understood by referring to the following description and accompanying drawings that are used to illustrate embodiments of the invention. In the drawings.

Figure 9:
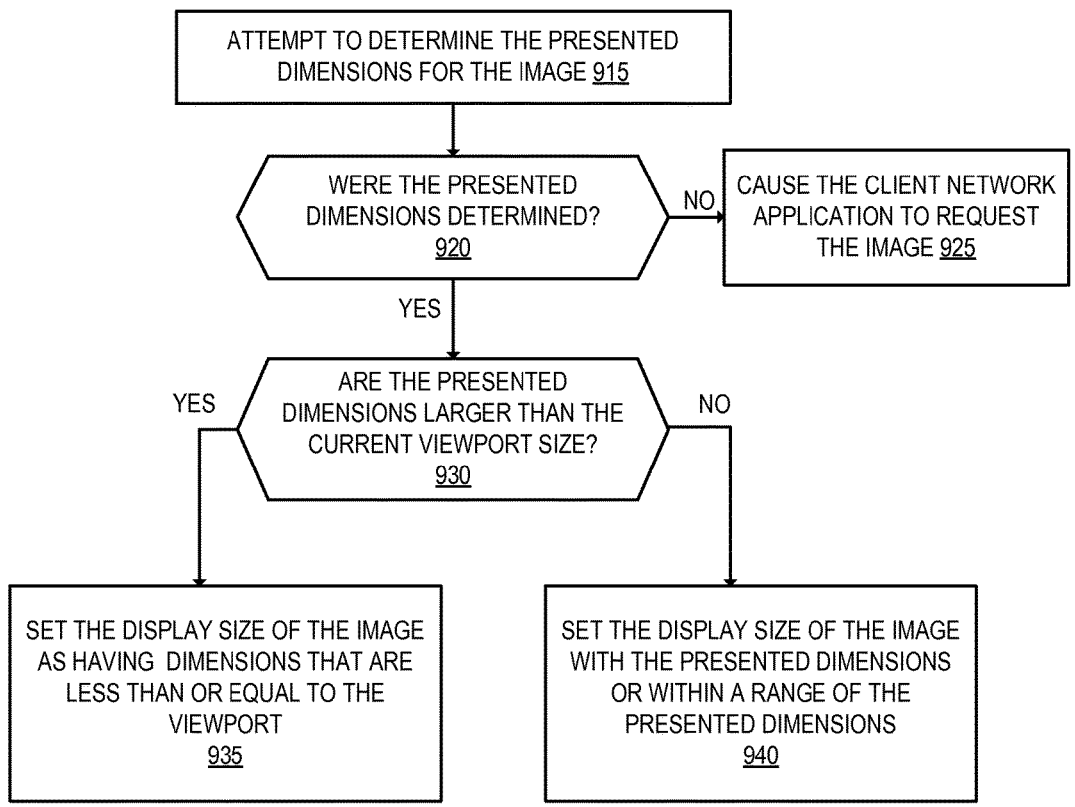
Figure 10:
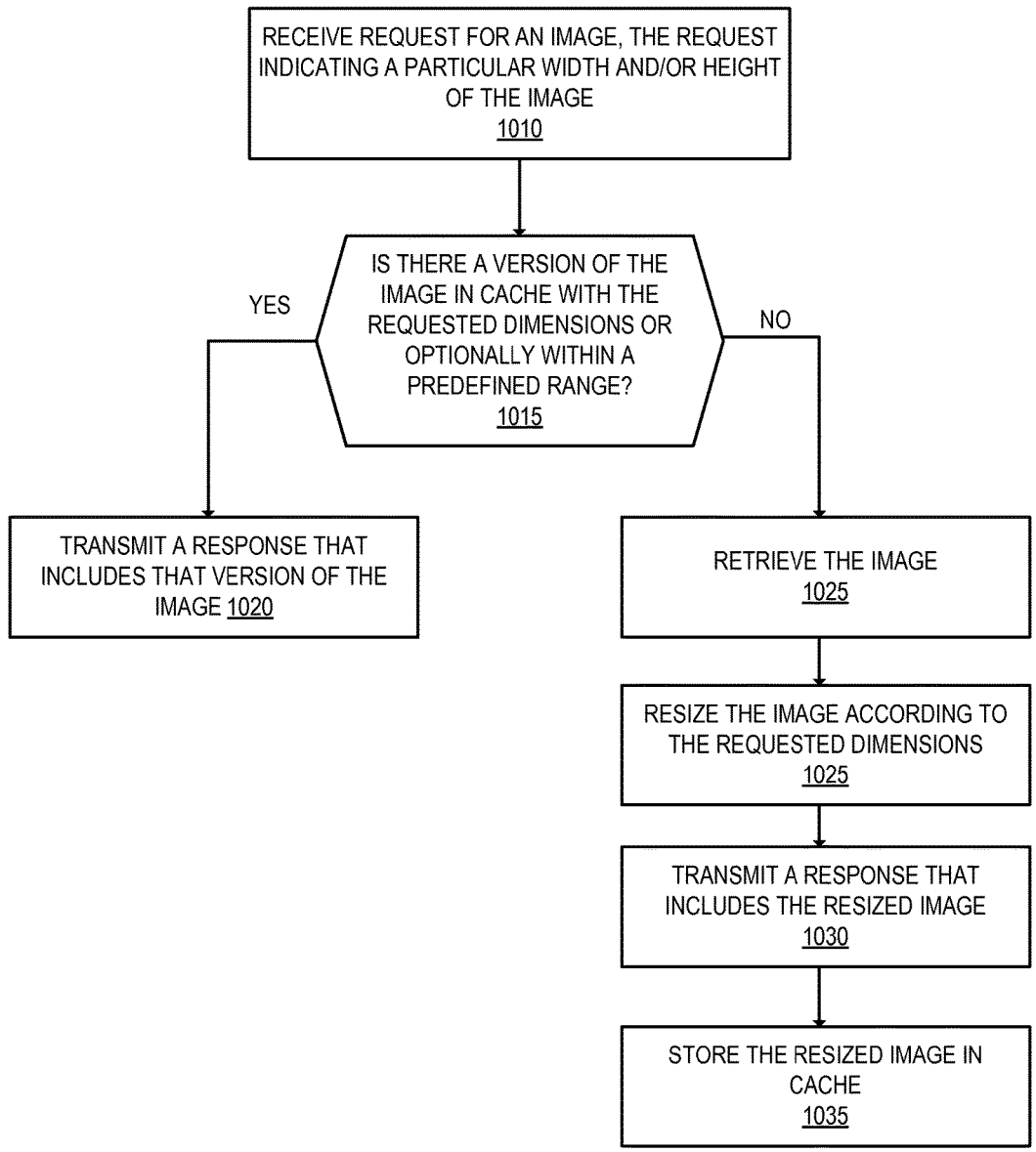
Figure 11:
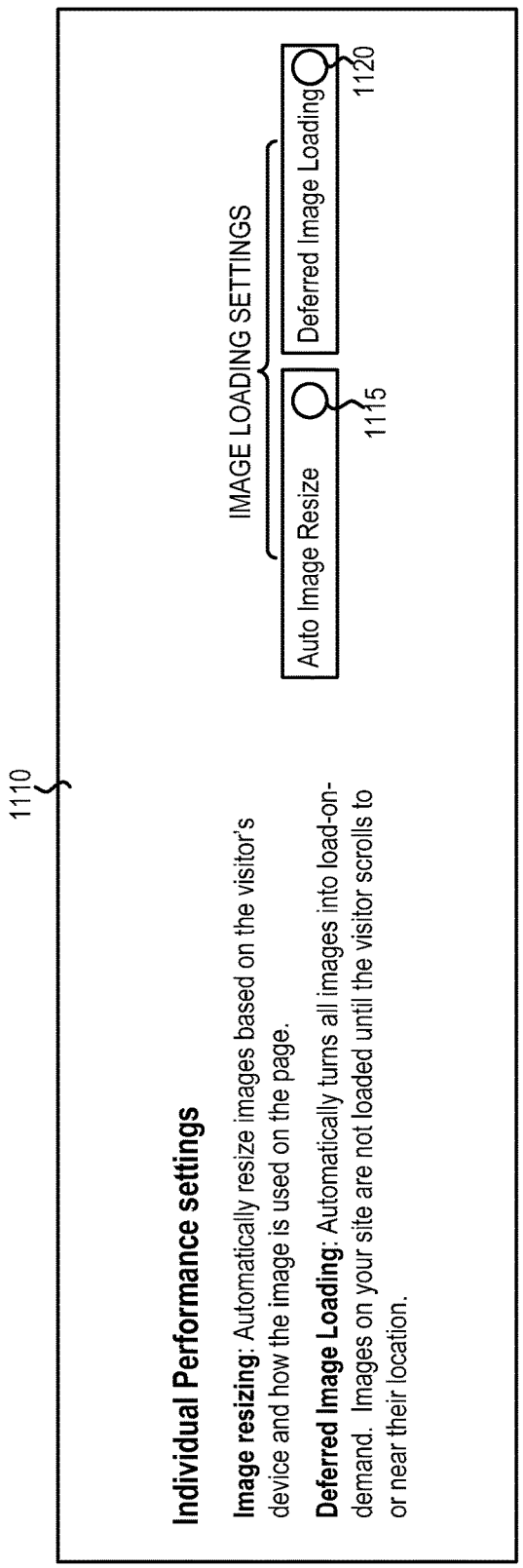
Figure 16:
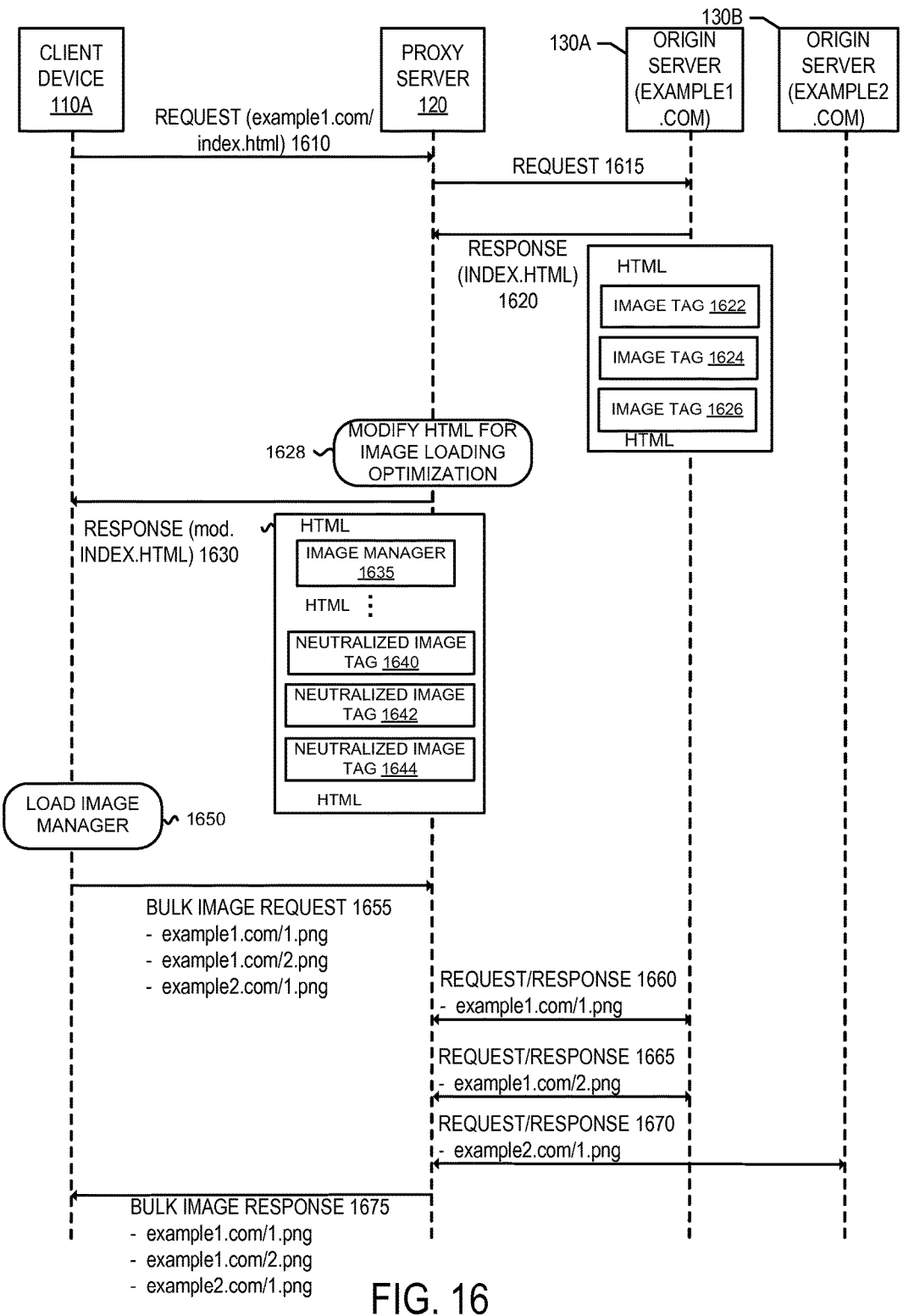
Figure 17:
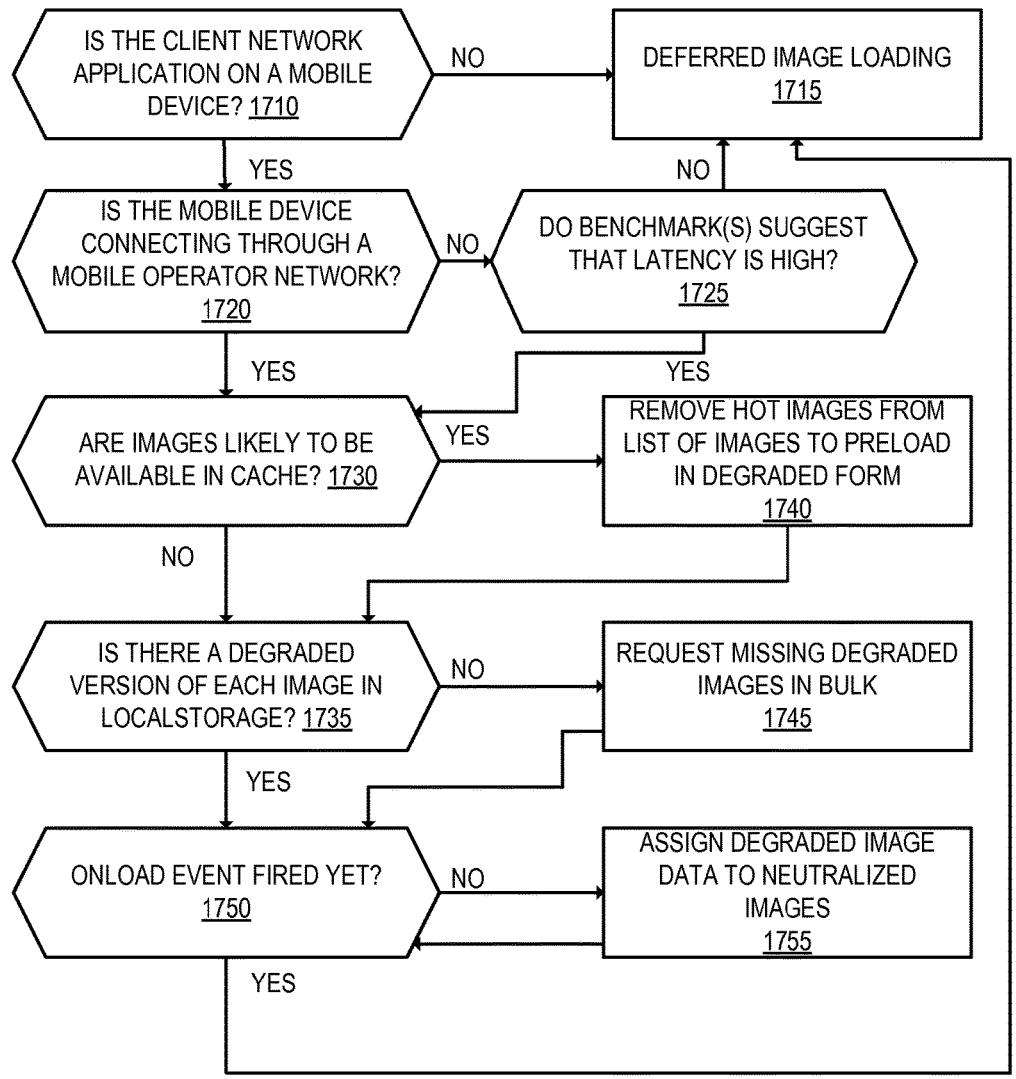
Figure 18:
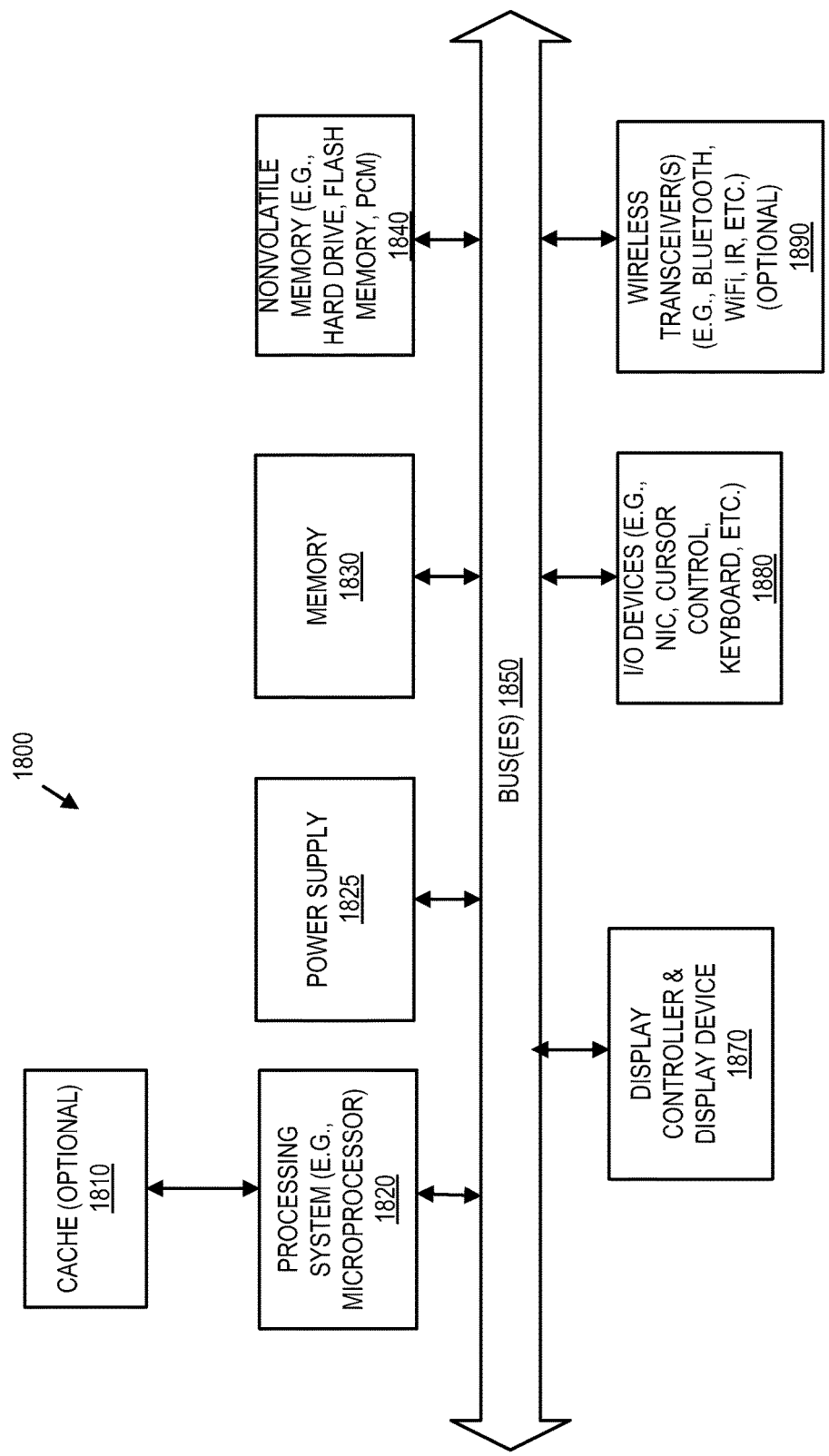

referenced in a web page to be requested by the client network application with a set of one or more dimensions according to one embodiment;

FIG. 9 is a flow diagram that illustrates exemplary operations performed by a set of one or more client-side scripts for determining the display size of the image according to one embodiment;

FIG. 10 is a flow diagram illustrating exemplary operations performed by a proxy server for performing auto-resizing of images according to one embodiment;

FIG. 11 is an exemplary interface for the control servers that allows a customer to enable or disable the deferred image loading and/or image auto-resizing functionality described herein, according to one embodiment; and FIG. 12 illustrates an exemplary format for an image tag included in a page prior to the proxy server neutralizing the image tag;

FIG. 13 illustrates the neutralized version of the image tag of FIG. 12 according to one embodiment;

FIG. 14 illustrates a single URL that may be created by the image manager for requesting multiple images in a single request according to one embodiment;

FIG. 15 illustrates an exemplary format for bulk image responses according to one embodiment;

FIG. 16 illustrates an exemplary implementation of image request reduction according to one embodiment;

FIG. 17 is a flow diagram that illustrates exemplary operations for optimizing image loading according to one embodiment; and FIG. 18 illustrates an exemplary format of a computer system of devices of the cloud-based proxy service according to one embodiment.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. In the following description and claims, the terms "coupled" along with its derivatives, may be used. "Coupled" is used to indicate that two or more elements, which may or may not be in direct physical or electrical contact with each other, co-operate or interact with each other.

A method and apparatus for automatically optimizing the loading of images is described. In one embodiment, the loading of the images is automatically managed in a cloud-based proxy service that includes one or more proxy servers that are situated between the end users (e.g., users using a browser or other client network application to access network content) and origin server(s) that host the network content. In the cloud-based proxy service, requests for network resources (e.g., web pages such as HTML documents, images, word processing documents, PDF files, movie files, music files, or other computer files) are received at a proxy server of the cloud-based proxy service. The proxy server may modify the requested resource prior to transmitting a response to the requesting client (if the network resource is not stored in a locally available cache, the proxy server may transmit a request to the appropriate origin server for the network resource). As will be described in greater detail later herein, the proxy server may cause the loading of images in a page to be optimized. In one embodiment, the cloud-based proxy service is available as a service over the Internet and does not require customers (e.g., domain owners and/or personnel working on behalf of domain owners) to install additional hardware or software in order to support the service. In one embodiment, the cloud-based proxy service is provisioned through a change in Domain Name System (DNS) records of the customers.

The proxy server is configured to automatically cause image loading to be optimized for a client device. Optimized image loading may include one or more of the following: prioritizing the loading of image(s) whose corresponding image placeholder(s) are in the viewport and optionally in close proximity to the viewport over those image(s) whose corresponding image placeholder(s) are not in the viewport and/or not in close proximity to the viewport (sometimes referred herein as deferred image loading), automatically resizing image(s) to a size appropriate for how they are set as being displayed and/or the size of the viewport of the requesting device (sometimes referred herein as image auto-resizing), reducing the number of requests for images of the page (sometimes referred herein has image request reduction), and progressive enhancement image loading where degraded versions of images precede their full quality counterparts (sometimes referred herein as progressive enhancement). In one embodiment, which one or more optimizations that are applied to a page depends on the type of client network application and/or whether the client is connecting over a mobile operator's network (where bandwidth is typically limited and latency may be high) versus connecting over a wired or WiFi network (where bandwidth and latency are less of a concern).

Deferred image loading priorities the loading of images whose corresponding image placeholders are in the viewport (or in some embodiments in close proximity to the viewport) over images whose corresponding image placeholders are not in the viewport and/or not in close proximity to the viewport. The other image(s) whose corresponding placeholder(s) of the page that are not in the viewport may be loaded as they are needed (e.g., when they become in the viewport) or as there are spare network resources available.

As an example of image auto-resizing, if an image that is 1000 pixels by 1000 pixels is set to be displayed at 100 pixels by 100 pixels, the image may be automatically resized and delivered to the visitors at the appropriate size (e.g., 100 pixels by 100 pixels). As another example, if the size of the viewport of a device is 960 by 640 pixels (which is a common size for mobile devices), a background image that is 2000 pixels wide will be automatically downsized so that more pixels are not delivered to the visitor than can be displayed.

As described above, one image loading optimization is reducing the number of requests for images of the page. In one embodiment, the number of requests is reduced by grouping multiple, different requests for images, into a single request (known herein as a bulk request) (e.g., a single HTTP request). For example, the image manager (executed by the client network application) may create a single canonical URL that represents multiple images of the page that are to be sent back into a response. This single URL may be created by combining the individual URLs for all images into a single string and appending them to the query parameters of the single request (typically in URL-encoding). In some embodiments a single request includes all images for the page. In other embodiments, there may be multiple requests for images of the page each of which itself includes requests for multiple images.

In one embodiment, the management of images may be different depending on the connection of the client. For example, the management of images may be different for visitors connecting over a mobile operator's network (where bandwidth is typically limited and latency may be high) versus visitors connecting over a wired or WiFi network (where bandwidth and latency are less of a concern). By way of example, in one embodiment, if a visitor is connecting over a mobile operator's network (e.g., 2G, 3G, 4G), only the images that are in the viewport will be delivered to the visitors; whereas if a visitor is connecting over a wired or WiFi network, the images in the viewport will be prioritized and the other images will be loaded in the background (which may be prioritized based on where they appear in the page).

In one embodiment, the image loading optimizations described herein (deferred image loading, auto-resizing, image request reduction, and/or progressive enhancement) are provided through the cloud-based proxy service that is available on the Internet as a service and does not require customers to install additional hardware or software in order for the image optimizations to be performed. In addition, the image loading optimizations can be performed automatically without requiring the user to change any of their HTML.

Figure 1:
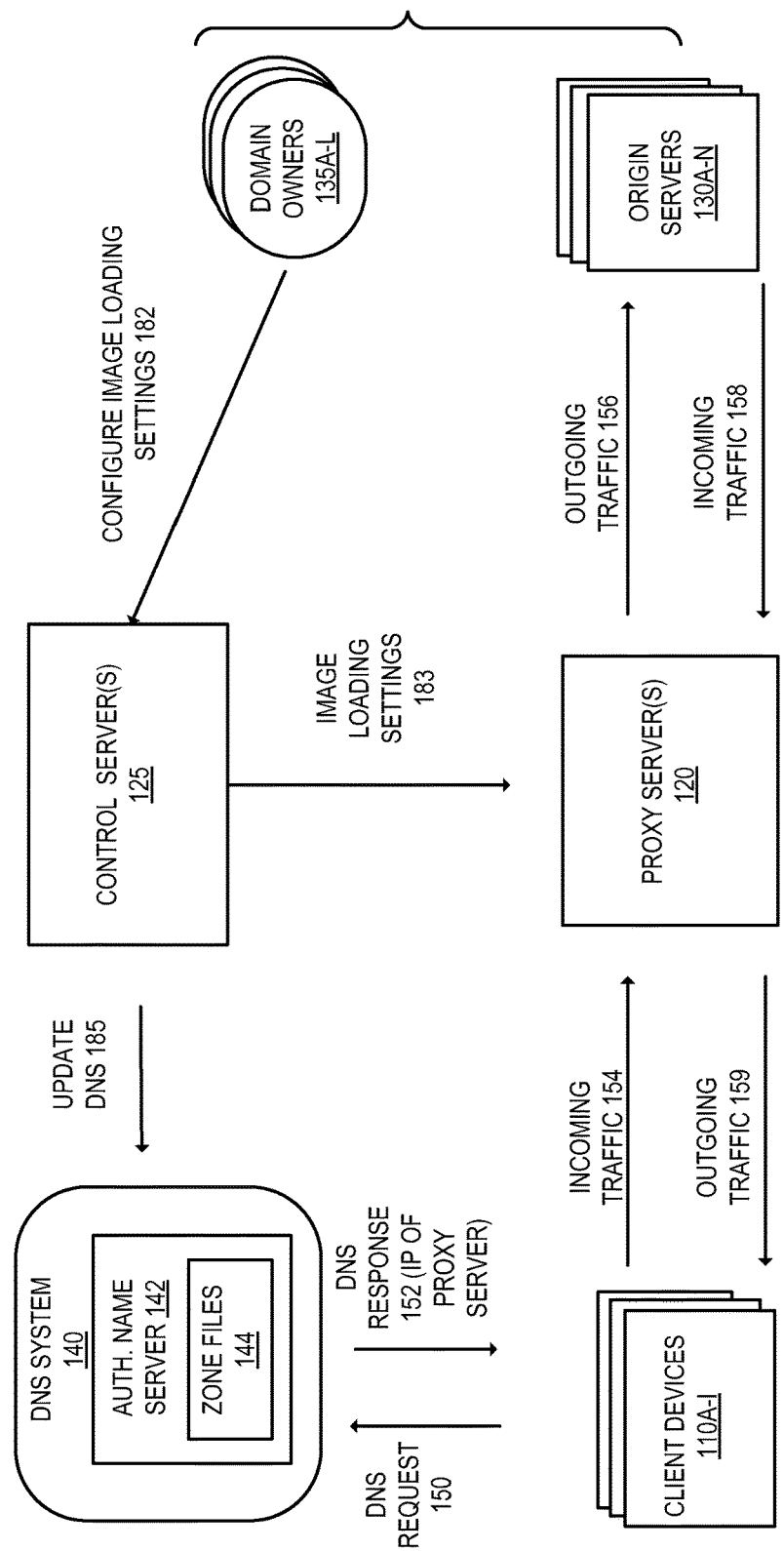
FIG. 1 illustrates an exemplary system for a cloud-based proxy service according to one embodiment.

FIG. 1 illustrates an exemplary system for a cloud-based proxy service according to one embodiment. The cloud-based proxy service illustrated in FIG. 1 includes a set of proxy server(s) 120 that are situated between the client computing devices 110A-I and the origin servers 130A-N. In one embodiment, the proxy server(s) 120 are reverse proxy servers. Certain network traffic is received and processed through the set of proxy server(s) 120. For example, web traffic (e.g., HTTP requests/responses, HTTPS requests/responses, etc.) for domains of the origin servers 130A-N may be received and processed at the proxy server(s) 120. In one embodiment, the domain owners 135A-L are customers of the cloud-based proxy service and certain network traffic for their websites are received at processed at the proxy server(s) 120.

The client devices 110A-I are computing devices (e.g., laptops, workstations, smartphones, palm tops, mobile phones, tablets, gaming systems, set top boxes, etc.) that are capable of transmitting and receiving network traffic. Each of the client devices 110A-I executes a client network application that is capable of transmitting network traffic and loading network traffic. For example, the client network application may be a web browser or other application that can access network resources (e.g., web pages, images, word processing documents, PDF files, movie files, music files, or other computer files).

The origin servers 130A-N are computing devices that serve network resources (e.g., web pages, images, word processing documents, PDF files movie files, music files, or other computer files). Although not illustrated in FIG. 1, it should be understood that the network resources of the origin servers 130A-N may be stored separately from the device that responds to the requests.

The cloud-based proxy service may provide different services for customers (e.g., the domain owners 135A-L). By way of example, the cloud-based proxy service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), and/or other services. In one embodiment and as described in greater detail later herein, the cloud-based proxy service also provides image loading optimization (e.g., deferred image loading, auto-resizing, image request reduction, and/or progressive enhancement) for the domain owners 135A-L.

Generally speaking, the proxy server(s) 120 receive certain network traffic from the client devices 110A-I that are destined for one of the origin servers 130A-N. For example, a proxy server 120 may receive requests for an action to be performed on an identified resource of an origin server (e.g., an HTTP GET request, an HTTP POST request, other HTTP request methods, or other requests to be applied to an identified resource on an origin server) from the client devices 110A-I. As illustrated in FIG. 1, the incoming traffic 154 is received at one of the proxy server(s) 120.

The proxy server(s) 120 analyze the incoming traffic 154 and take one or more actions on the incoming traffic. In some embodiments, the incoming traffic 154 is received at a particular proxy server 120 as a result of a DNS request 150 for a domain of one of the domain owners 135A-L resolving 152 to an IP address of the proxy server 120. By way of example, DNS record(s) for the domain "example.com" may resolve to an IP address of a proxy server 120. In some embodiments, multiple domains that may be owned by different domain owners may resolve to the same proxy server 120 (e.g., the same IP address or a different IP address of the proxy server 120).

By way of a specific example, the incoming traffic 154 may be a request for a web page which includes a set of one or more images. A proxy server 120 that receives a request for a page determines whether deferred image loading, auto-resizing, image request reduction, and/or progressive enhancement is enabled for that web page. The proxy server 120 may retrieve the requested page from its cache if available and it has not expired. Alternatively, the proxy server 120 may issue a request to the appropriate origin server 130 for the page (part of the outgoing traffic 156). The proxy server 120 receives incoming traffic 158 from the origin server (e.g., an HTTP response with the requested content).

After retrieving the requested page and after determining that image loading optimization (e.g., deferred image loading, auto-resizing, image request reduction, and/or progressive enhancement) is enabled for that page, the proxy server 120 modifies the retrieved page to cause the loading of the images to be deferred, cause the size of the images that are loaded to be optimized for the page and device, cause the number of requests for the images to be reduced, and/or cause degraded versions of images to precede their full quality counterparts. The proxy server(s) 120 transmit responses to the client devices 110A-I in the outgoing traffic 159.

The DNS system 140 is used to refer to the DNS system as a whole and includes multiple DNS servers to resolve DNS requests. As illustrated, the DNS system 140 includes the authoritative name server 142, which may be an authoritative name server for the cloud-based proxy service and the domains hosted at the origin servers 130A-N. It should be understood that the DNS system 140 may include more DNS servers (e.g., preferred domain servers, top-level domain name servers, or other domain servers) than illustrated. It should also be understood that there may be multiple authoritative web servers for the service and they may be geographically distributed. In one embodiment, the authoritative name servers for each the domains have been changed to the authoritative name server 142, which is associated with the service. It should be understood that the backup authoritative name servers serving the domains may also be changed. In one embodiment, the zone file records 144 for the domains of the domain owners 135A-L are changed such that DNS resolution requests for those domains resolve to the proxy server(s) 120.

Although not illustrated in FIG. 1, in one embodiment the cloud-based proxy service includes multiple nodes (referred herein as "proxy service nodes"). Each proxy service node may include any of one or more proxy servers, one or more control servers, one or more DNS servers (e.g., one or more authoritative name servers), and one or more other pieces of networking equipment (e.g., one or more routers, switches, hubs, etc.). The proxy service node may be part of the same physical device or multiple physical devices. For example, the proxy server(s), control server(s), and DNS server(s) may be virtual instances running on the same physical device or may be separate physical devices. Each proxy service node may be part of a data center or a collocation site.

The cloud-based proxy service also includes the control server(s) 125 which are operated by the service. In one embodiment, the control server(s) 125 provide a set of tools and interfaces for the domain owners 135A-L and is accessible over the Internet. For example, the control server(s) 125, among other things, allow the customers 135A-L to register for the cloud-based proxy service and configure 182 the image loading settings. In some embodiments, the domain owners 135A-L register for the cloud-based proxy service including changing their authoritative name server(s) to authoritative name server(s) of the service (the service may specify to the domain owners the name server(s) to use). Although not illustrated, the control server(s) 125 may provide an interface (e.g., a website) for the domain owners 135A-L to register for the cloud-based proxy service and possibly change their authoritative name server(s) and DNS record(s). In addition, the IP address(es) that resolve to their origin server(s), which host content of their domain, are changed to point to a proxy server 120, which are typically chosen by the service. In other embodiments, individual DNS records are changed to point to a proxy server 120 (or point to other domain(s) that point to a proxy server of the service). For example, a DNS record of a domain owner can be changed to point to a CNAME that corresponds with a proxy server 120. The control server(s) 125 may transmit a DNS update 185 to the DNS system 140 to change the DNS record(s) of a domain owner. Regardless of the embodiment, traffic from visitors that are directed to a customer's domain is received at one of the proxy server(s) 120.

Upon configuring image loading for their domain (e.g., deferred image loading and/or image automatic resizing), the control server 125 transmits the appropriate setting 183 to the proxy server(s) 120. This setting may be stored in the proxy server(s) 120 and accessed when receiving a request for a page of their domain.

After a page is retrieved, the proxy server 120 modifies the page for automatically optimizing image loading. In a specific example, the proxy server 120 parses the retrieved page and analyzes its image tags, and modifies the image tags such that the image will not be displayed and the client network application will not request the image. This is sometimes referred herein as neutralizing the image tag. In one embodiment, the image objects remain in the Document Object Model (DOM) (that is, they are not removed from the DOM). For example, the proxy server 120 changes the src attribute (which specifies the location of the image—often a URL) such that the client network application will not issue a request for the image, while maintaining the information specifying the location of the image. For example, the proxy server 120 may modify the name of the src attribute to a value that is unrecognized by the client network application. By way of example, the proxy server 120 may prepend "data-cf" to the "src" attribute in the HTML (e.g., modify "src" to "data-cfsrc") of the retrieved page. This causes the client network application to not make a request for that image as it does not recognize "data-cfsrc". Of course this is just an example and there are other ways to prevent the client network application from making the request for the image.

If the image tag has a style attribute, then the proxy server 120 changes the style attribute such that the client network application will not apply the style while still maintaining the information of the style (e.g., that style will be reapplied when the image is ready to be loaded). For example, the proxy server 120 may modify the name of the style attribute to a value that is unrecognized by the client network application. For example, the proxy server 120 may prepend "data-cf" to the "style" attribute in the HTML (e.g., modify "style" to "data-cfstyle"). This causes the client network application to not apply the style. Of course this is just an example and there may be other ways to prevent the client network application from applying the style.

The proxy server 120 also causes the image and/or the image placeholder to not be displayed while maintaining an image object in the DOM. In one embodiment, the proxy server 120 adds a style attribute to the image tag that causes the client network application to not display the image placeholder. For example, the proxy server 120 may add a style with the following value: style="display:none;". As another example, the proxy server 120 may add a style with the following value: style="visibility:hidden;". As another example, the proxy server 120 may add a style with the following value: style="display:none;visibility:hidden;". For purposes of explanation, the added style attribute is sometimes referred herein as the "null style attribute." In another embodiment, the proxy server 120 may cause a different image to be initially loaded by the client network application. This different image may not be visible to the user (e.g., the image may be a transparent image that the client network application renders in the background color where the image is to be placed). The different image may be of a small size (e.g., 1 by 1 pixels), which may be stretched according to the height and/or width of the original image. By way of example, the proxy server 120 may add a source attribute to the image tag that specifies the location of the different image, and may further have the width and/or height set the same as the original image. The proxy server 120 may alternatively add a source attribute to the image tag that embeds the image data inline into the html (e.g., add the image as a data Uniform Resource Identifier (URI) object), and may further set the width and/or height to be the same as the original image.

In some embodiments, the proxy server 120 inserts a set of one or more client-side scripts (e.g., JavaScript) and/or reference(s) to a set of one or more client-side scripts that, when executed by the client network application, restore the source attribute (and style attribute if one was originally included) for the image, when the corresponding image placeholder is located in the viewport or with a defined distance to the viewport. Since some client network applications may not be capable of executing client-side scripts or have disabled client-side scripts, the proxy server 120 may wrap the original image tag in a noscript tag. In this way, if the client network application does not support client-side scripts or has disabled execution of client-side scripts, the images will be loaded as they would normally.

FIG. 12 illustrates an exemplary format for an image tag included in a page prior to the proxy server 120 neutralizing the image tag. FIG. 13 illustrates the neutralized version of the image tag of FIG. 12 according to one embodiment. As illustrated in FIG. 13, the "src" attribute has been modified to "data-cfsrc", the "style" attribute has been modified to "data-cfstyle"; a new style has been added with the value: style="display:none;visibility:hidden;", and the original image tag is wrapped in a noscript tag.

In one embodiment, the proxy server 120 causes the optimized image loading to be performed on only those images that belong to the same domain as the requested page. For example, if the page is example.com; in this embodiment the proxy server 120 causes the loading of images to be optimized only on images of example.com (e.g., example.com/image.gif); not other domains (e.g., images of the domain example2.com). In another embodiment, the proxy server 120 causes the optimized image loading to be performed only on those images that are located on domains that are customers of the cloud-based proxy service. For example, if the image source is a third party source that is not on a domain that is a customer of the cloud-based proxy service, then in one embodiment the proxy server 120 does not neutralize that image tag for image loading optimization. In other embodiments, all images are subject to image loading optimization.

In one embodiment, the proxy server 120 adds code to the web page that, when executed by the client network application, selects the appropriate image loading optimization(s), initiates those selected image loading optimization(s), and participates in the execution of those selected image loading optimization(s). For example, the added code may be one or more client-side scripts and/or a reference to one or more client-side scripts that. This code (these client-side script(s)) will sometimes be referred herein as the image manager.

Deferred Loading of Images

In one embodiment, if deferred image loading is enabled for the requested network resource (or enabled for the domain of the requested network resource), the proxy server 120 modifies the page such that the loading of the image(s) whose corresponding image placeholder(s) are in the viewport and optionally in close proximity to the viewport will be prioritized over those image(s) whose corresponding image placeholder(s) are not in the viewport and/or not in close proximity to the viewport. The proxy server 120 may also modify the page such that the other image(s) of the page whose corresponding image placeholder(s) that are not in the viewport may be loaded as they are needed (e.g., when they are scrolled into the viewport) or as there are spare network resources available.

As previously described, in one embodiment, the proxy server 120 adds one or more client-side scripts and/or a reference to one or more client-side scripts that, when executed by the client network application, prioritizes the loading of the image(s) whose corresponding image placeholder(s) are in the viewport of the client network application or within a defined distance of the viewport over the image(s) whose corresponding image placeholder(s) are not in the viewport (if any). In one embodiment, the client-side script(s) attempts to determine the size of the viewport, the type of client device (this may help determine the size of the screen of the device), the type of network connection (e.g., over a mobile operator's network (where bandwidth is typically limited and latency may be high), over a wired or WiFi network (where bandwidth and latency are typically less of a concern)), and/or the location in the page where the images would be displayed with respect to the viewport.

In one embodiment, when the client side script determines that the location where the image is to be displayed is in the viewport or is within a threshold distance amount from the viewport (e.g., is less than X number of pixels from the viewport), the client-side script performs a number of actions to cause the client network application to request and display the image. For example, the client-side script rewrites the source attribute to cause the client network application to make a request for the image (e.g., by removing "data-cf" from "data-cfsrc"). If a style attribute for the image was originally included in the HTML (and modified by the proxy server 120), the client-side script rewrites the style attribute according to the original style attribute (e.g., by removing "data-cf" from "data-cfstyle"). The client-side script also removes the null style attribute, which causes the image (if retrieved) to be displayed.

In one embodiment, if the client is connecting through a mobile connection (through a mobile operator's network where bandwidth is typically limited and latency may be high), the client-side script causes only the image(s) whose corresponding image placeholder(s) are in the viewport or that are within a certain distance from the viewport to be loaded; whereas if the client is not connecting through a mobile connection (e.g., a wired network, WiFi, etc.), the image(s) whose corresponding image placeholder(s) are in the viewport and/or within a certain distance from the viewport are prioritized and the other images are loaded in the background (which may be prioritized based on where they appear in the page).

Figure 2:
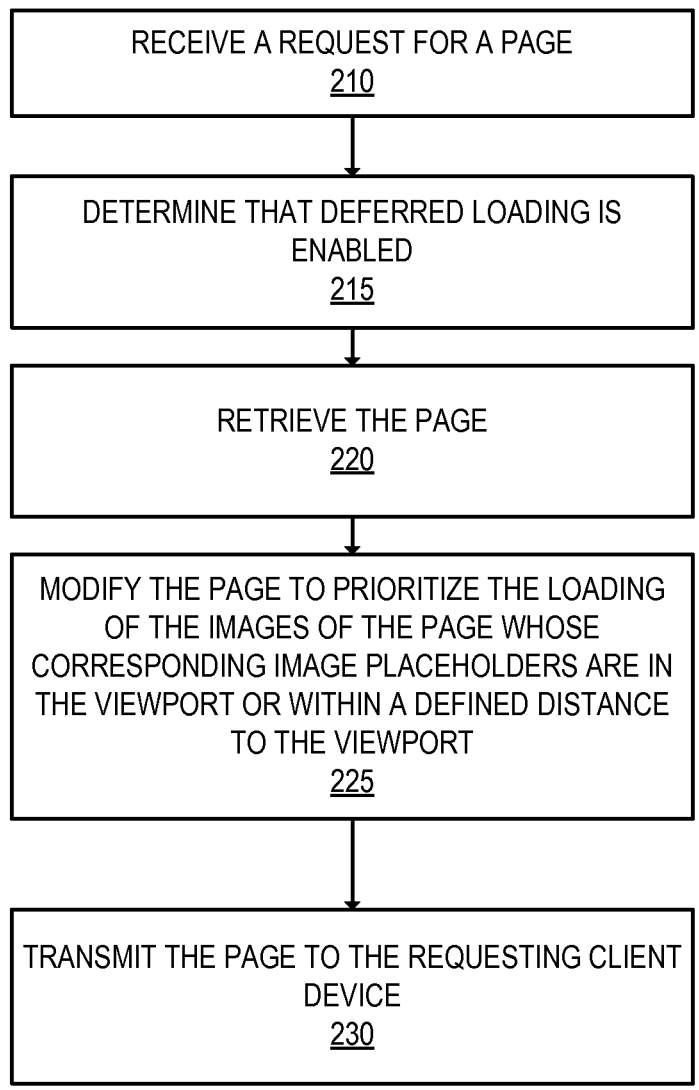
FIG. 2 is a flow diagram that illustrates exemplary operations performed on a proxy server for deferred image loading according to one embodiment.

FIG. 2 is a flow diagram that illustrates exemplary operations performed on a proxy server for deferred image loading according to one embodiment. The operations of this and other flow diagrams will be described with reference to the exemplary embodiments of FIG. 1. However, it should be understood that the operations of the flow diagrams can be performed by embodiments of the invention other than those discussed with reference to FIG. 1, and the embodiments of the invention discussed with reference to FIG. 1 can perform operations different than those discussed with reference to the flow diagrams.

At operation 210, a proxy server 120 receives a request for a page (e.g., an HTML page) that originates from a client network application of a client device. The request may be received as a result of a DNS request for the domain of the page resolving to an IP address of the proxy server 120. Next, at operation 215, the proxy server 120 determines that deferred image loading is enabled for the requested page. In one embodiment, the proxy server 120 accesses a set of one or more page rules for the domain of the requested page to determine whether deferred image loading has been enabled. Enabling deferred image loading will be described in greater detail later herein. In some embodiments the operation of 215 is optional (e.g., the deferred image loading is applied to every page). Flow then moves to operation 220.

At operation 220, the proxy server 120 retrieves the requested page. If the requested page is available in the proxy server's cache and it has not expired, the proxy server 120 may retrieve the requested page from its cache. The proxy server 120 may also retrieve the requested page from the origin server (e.g., transmit a request to the origin server for the page and receive a response from the origin server that includes the page). Flow then moves to operation 225.

At operation 225, the proxy server 120 modifies the page to prioritize the loading of the images of the page whose corresponding image placeholders are in the viewport or within a defined distance to the viewport. The defined distance to the viewport is a value that is small enough such that the visitor may scroll the viewport to view that image. For example, the defined distance may be within 100 pixels of the viewport. The defined distance may be predefined in one embodiment (e.g., hard coded in the code of the page) or determined based on the size of the viewport of the client network application.

As an example of modifying the page, the proxy server 120 may modify the image tags such that they will not (at least initially) be requested by the client network application. In addition, the proxy server 120 may also add one or more client-side scripts (e.g., JavaScript) and/or references to one or more client-side scripts that, when executed by the client network application, cause the images to be loaded when the corresponding image placeholders are located within the viewport of the client network application or within a defined threshold distance from the viewport (e.g., within 100 pixels from the viewport).

Flow then moves to operation 230 where the proxy server 120 transmits the modified page to the requesting client device. The proxy server 120 may also store the modified page in its cache such that upon receiving a subsequent request for the page (from the same client device or from a different client device), the proxy server 120 may transmit the modified page to the requesting client device without having to modify the page again.

Figure 3:
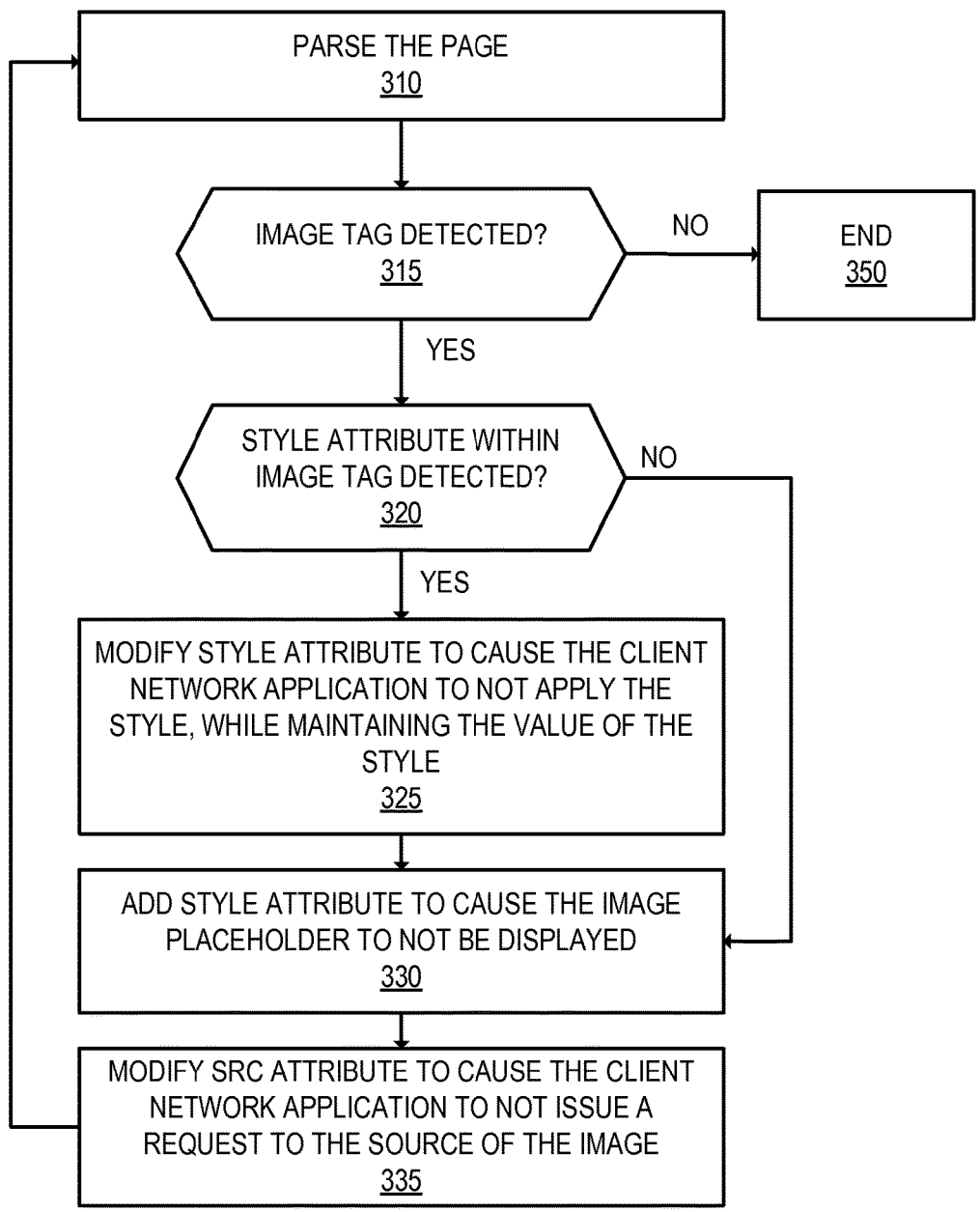
FIG. 3 is a flow diagram that illustrates exemplary operations for modifying a page such that the client network application will not (at least initially) load at least certain images of the page according to one embodiment.

FIG. 3 is a flow diagram that illustrates exemplary operations for modifying a page such that the client network application will not (at least initially) load at least certain images of the page according to one embodiment. At operation 310, the proxy server 120 begins to parse the page in an attempt to locate the image tags in the page (e.g., "<img . . . />"). If an image tag is detected at operation 315, then flow moves to operation 320, otherwise flow moves to operation 350 where the operations of FIG. 3 end.

At operation 320, if the parser detects that there is a style attribute within the image tag, then flow moves to operation 325; otherwise flow moves to operation 330. At operation 325, the style attribute is modified to cause the client network application (e.g., the browser) to not apply the style, while maintaining the value of the style. The value of the style is maintained so that it can be reapplied when/if the image is to be loaded. For example, the proxy server 120 may prepend "data-cf" to the "style" attribute in the HTML (e.g., modify "style" to "data-cfstyle"), which causes the client network application to not apply the style. Flow moves from operation 325 to operation 330.

At operation 330, a style attribute is added to the image tag to cause the client network application not to display the image placeholder. For example, "style="display:none;visibility:hidden;" may be added to the image tag to cause the client network application not to display the image placeholder. As another example, the proxy server 120 may add a style with the following value: style="display:none;". As another example, the proxy server 120 may add a style with the following value: style="visibility:hidden;". Flow moves from operation 330 to operation 335.

In another embodiment, instead of adding a style attribute to the image tag to cause to cause it not to be displayed, the proxy server 120 may cause a different image to be initially loaded by the client network application and displayed in the original image's placeholder. This different image may not be visible to the user (e.g., the image may be a transparent image that the client network application renders in the background color where the image is to be placed). The different image may be of a small size (e.g., 1 by 1 pixels), which may be stretched according to the height and/or width of the original image. By way of example, the proxy server 120 may add a source attribute to the image tag that specifies the location of the different image, and may further have the width and/or height set the same as the original image. The proxy server 120 may alternatively add a source attribute to the image tag that embeds the image data inline into the html (e.g., add the image as a data Uniform Resource Identifier (URI) object), and may further set the width and/or height to be the same as the original image.

At operation 335, the source attribute of the image tag is modified to cause the client network application to not issue a request to the source of the image, while maintaining the information that specifies the location of the image. For example, the proxy server 120 may modify the name of the src attribute to a value that is unrecognized by the client network application. By way of example, the proxy server 120 may prepend "data-cf" to the "src" attribute in the HTML (e.g., modify "src" to "data-cfsrc"), which causes the client network application to not make the request since it does not recognize "data-cfsrc". Flow moves from operation 335 back to operation 310 where the page continues to be parsed.

Although not illustrated in FIG. 340, in some embodiments the proxy server also maintains the original image tag but wraps it within a noscript tag. In this way, if a client network application does not support client-side scripts or has them disabled, the images will be displayed as they would normally. In such an embodiment, the proxy server may copy the content of the original image tag and operate on the copied image tag when making the above modifications. Also, in such an embodiment, the image tag that has been modified for deferred image loading may be placed in the HTML directly before or directly after the original image tag that has been wrapped in a noscript tag.

In one embodiment, the proxy server defers the loading of only those images that have a source on the same domain as the requested page. In such an embodiment, after detecting an image tag, the proxy server determines whether the source of the image tag is of the same domain as the requested page. If they are the same, then the operations described with respect to operations 320 to 335 are performed. If they are not the same, then those operations would not be performed.

In another embodiment, the proxy server defers the loading of only those images that have a source with a domain that resolves to a proxy server of the cloud-based proxy service, even if that domain is different than the domain as the requested page. In such an embodiment, after detecting an image tag, the proxy server determines whether the source of the image tag is of a domain that resolves to a proxy server of the cloud-based proxy service. For example, the proxy server may have a list of the domains that resolve to a proxy server of the cloud-based proxy service. If the domain resolves to a proxy server of the cloud-based proxy service, then the operations described with respect to operations 320 to 335 are performed. If the domain does not resolve to a proxy server of the cloud-based proxy service, then those operations would not be performed.

In another embodiment, the proxy server defers the loading of each of the images, regardless of the source of the image.

In addition to modifying the image tags such that they will not (at least initially) be requested by the client network application, the proxy server also adds one or more client-side scripts (e.g., JavaScript) and/or references to one or more client-side scripts that, when executed by the client network application, causes the images to be loaded when the corresponding image placeholders are located in the viewport or within a defined distance to the viewport. For example, the client-side script(s), when executed by the client network application, detects the location of the image placeholders (at least for those images whose loading has been deferred) with respect to the viewport. When an image placeholder is located within the viewport or, in some embodiments within a certain distance from the viewport (e.g., within 100 pixels of the viewport), the client-side script(s) perform a number of actions to cause the client network application to request and display the corresponding image. For example, the client-side script(s) rewrite the source attribute to cause the client network application to make a request for the image (e.g., by removing "data-cf" from "data-cfsrc"). If a style attribute for the image was originally included in the HTML (and modified by the proxy server 120), the client-side script(s) rewrite the style attribute according to the original style attribute (e.g., by removing "data-cf" from "data-cfstyle"). The client-side script(s) also remove the null style attribute, which causes the image (if retrieved) to be displayed.

In some embodiments, the client-side script(s) only cause the images whose corresponding image placeholders are located in the viewport and optionally those that are within a certain distance from the viewport to be loaded (e.g., if the requesting client device is connecting over a mobile operator's network such as 3G or 4G). Thus, in these embodiments, only when an image placeholder scrolls into the viewport or within a certain distance from the viewport, the client-side script(s) will cause the client network application to request and download the corresponding image. In other embodiments, for example if the requesting client device is not connecting over a mobile operator's network (e.g., a WiFi connection, a wired connection, etc.), the client-side script(s) prioritize the loading of the images whose corresponding image placeholders are currently located in the viewport and optionally those that are within a certain distance from the viewport; and causes other image(s) (if any) to be loaded in the background when bandwidth is available.

Figure 4:
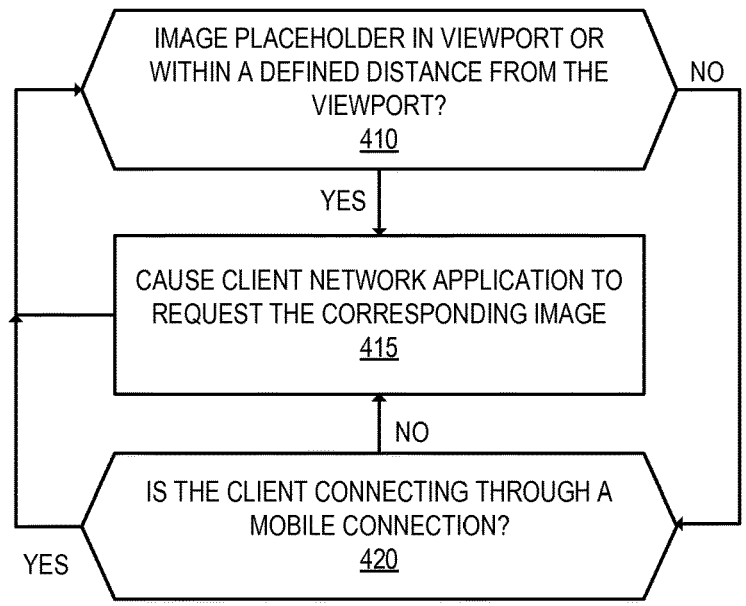
FIG. 4 is a flow diagram that illustrates exemplary operations performed by one or more client-side scripts for deferred loading of images according to one embodiment.

FIG. 4 is a flow diagram that illustrates exemplary operations performed by one or more client-side scripts for deferred loading of images according to one embodiment. The operations described with reference to FIG. 4 are performed by the set of one or more deferred loading client-side scripts that are either included in the modified page that is transmitted to the requesting client device and/or referenced in the modified page.

At operation 410, the set of client-side scripts determine whether an image placeholder is in the viewport or in some embodiments if it is within a defined distance from the viewport. In order to determine this, the current size of the viewport of the client device is determined. In some embodiments the set of client-side scripts perform a series of checks to determine the size of the viewport (the viewport width and height variables). These checks may include determining whether there is an innerWidth variable defined in the window. If there is, the innerWidth and innerHeight may be used for the viewport width and height variables. If there is not, the client-side script(s) may determine whether the clientWidth (or clientHeight) variable is defined for the document. If there is, the clientWidth and clientHeight variables are used for the viewport width and height variables. If there is not, the client-side script(s) may read the body element and read the clientWidth and clientHeight variables and use those for the viewport width and height variables.

In addition to determining the size of the viewport, the set of client-side scripts also determine the location of the image placeholders with respect to the viewport. For example, the position of the scrollbar is determined and from that value, the width of the top border of the image placeholder is subtracted. That value is then added to the height of the viewport (e.g., as determined by the viewport height variable). The resulting value is subtracted from the top of the bounding rectangle of the image placeholder. The resulting value is a pixel distance from the top of the image placeholder to the viewport.

If the image placeholder is not in the viewport or within a certain distance from the viewport, then flow moves to operation 420 (which is optionally performed in some embodiments). If the image placeholder is in the viewport or within a certain distance from the viewport, then flow moves to operation 415 where the client-side scripts cause the client network application to request the corresponding image. For example, the set of client-side scripts rewrite the source attribute to cause the client network application to make a request for the image (e.g., by removing "data-cf" from "data-cfsrc"). If a style attribute for the image was originally included in the HTML (and modified by the proxy server 120), the set of client-side scripts rewrite the style attribute according to the original style attribute (e.g., by removing "data-cf" from "data-cfstyle"). The set of client-side scripts also remove the null style attribute, which causes the image (if retrieved) to be displayed. Flow moves from operation 415 back to operation 410.

Figure 5:
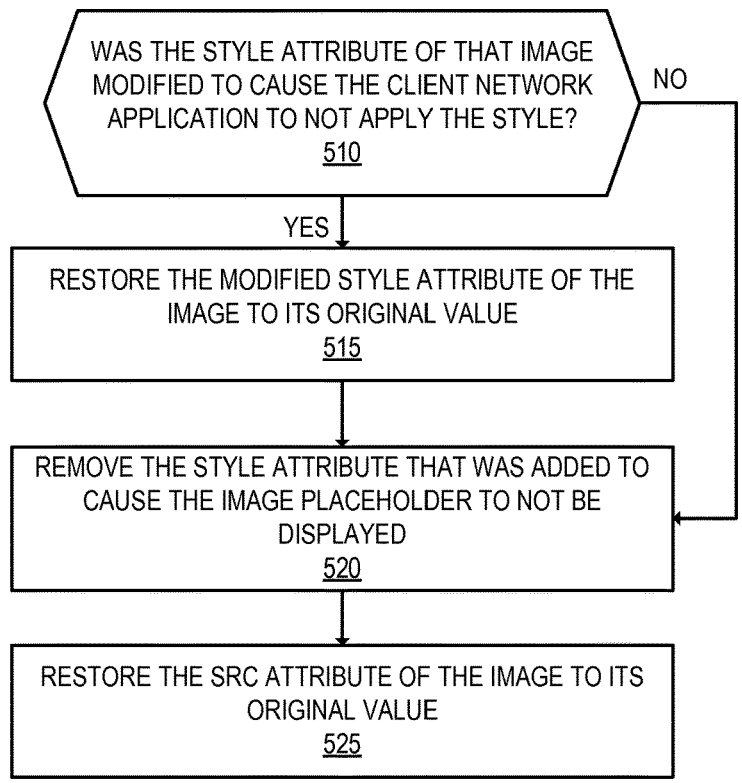
FIG. 5 is a flow diagram that illustrates exemplary operations that are performed by the set of client-side scripts when causing the client network application to request the image according to one embodiment.

FIG. 5 is a flow diagram that illustrates exemplary operations that are performed by the set of client-side scripts when causing the client network application to request the image according to one embodiment. For example, the operations described with reference to FIG. 5 may be performed as part of the operation 415 of FIG. 4. At operation 510, the set of client-side scripts determine whether the style attribute of the image that is to be requested was modified to cause the client network application to not apply the style. By way of example and not limitation, if the proxy server 120 modified the style attribute to cause the client network application to not apply the style while maintaining the value of the style by prepending "data-cf" to the "style" attribute (e.g., "style" was changed to "data-cfstyle"), the set of client-side scripts analyzes the image tag to determine whether that specific attribute name (data-cfstyle) is included in the image tag. If the original style attribute of the image was modified, then flow moves to operation 515, otherwise flow moves to operation 520.

At operation 515, the set of client-side scripts restore the modified style attribute of the image to its original value. For example, the set of client-side scripts may restore the name of the style attribute to "style" (e.g., remove "data-cf" from "data-cfstyle"). Next, flow moves to operation 520 where the set of client-side scripts remove the style attribute that was added to the image tag to cause the image placeholder to not be displayed (the null style attribute). Next, flow moves to operation 525 where the set of client-side scripts restore the source attribute of the image tag to its original value. By way of example, if the proxy server 120 modified the name of the source attribute (e.g., by prepending "data-cf" to "src"), the set of client-side scripts restore the original name of the source attribute (e.g., by removing "data-cf" from "data-cfsrc").

As will be described in greater detail later herein, the set of client-side scripts may also request the image to have a particular size based on how the image is used on the page and the size of the viewport. For example, the set of client-side scripts may determine that an image is 1000 pixels by 1000 pixels, but is set to be displayed at 100 pixels by 100 pixels. The set of client-side scripts may cause the client network application to request the image have a smaller size (e.g., 100 pixels by 100 pixels). In response to this request, the proxy server or other device in the service may automatically resize the image accordingly and deliver the resized image, or retrieve a smaller sized version of the image (e.g., from cache) and deliver the resized image to the client device. As another example, if the set of client-side scripts determine that the size of the viewport of a device is 960 by 640 pixels (which is a common size for mobile devices), but a background image is 2000 pixels wide, the set of client-side scripts may cause the client network application to request the background image to be of a size no larger than can be displayed by the device.

In some embodiments, even if the image placeholder is not in the viewport or within a defined distance from the viewport, the set of client-side scripts cause the client network application to request the image when there is available bandwidth. In one embodiment, available bandwidth depends on whether the client is connecting through a mobile operator's network or through a different type of network (e.g., wired, WiFi, etc.).

At operation 420, the set of client-side scripts determine whether the client device is connecting through a mobile connection (e.g., 2G, 3G, 4G, etc.). The set of client-side scripts may determine the connection of the requesting client device by examining the navigator property, which some mobile browsers use to reveal information relating to the connection the browser is using (e.g., WiFi, 2G, 3G, 4G, etc.). If the client is connecting through a mobile connection, then flow moves back to operation 410. If the client is not connecting through a mobile connection (e.g., the client is connecting via WiFi, a wired network, etc.), then flow moves to operation 415 where the set of client-side scripts cause the client network application to request the image. Thus, in this embodiment, if the client is connecting through a mobile connection, then the client-side script(s) only cause the client network application to request images when they are in the viewport or optionally within a certain distance from the viewport (at least for those images whose loading has been deferred).

Figure 6A:
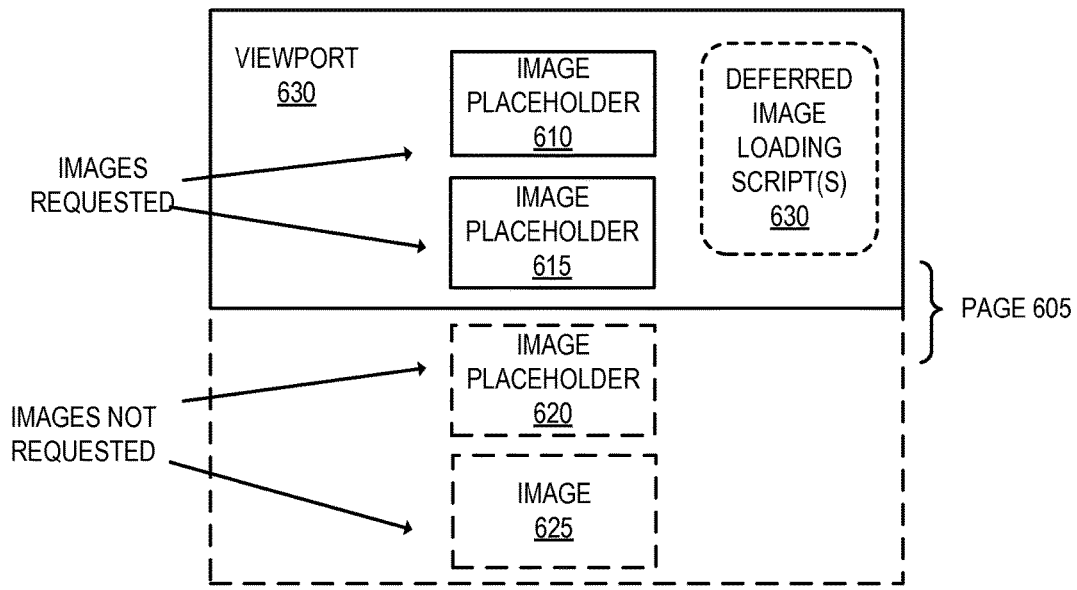
FIG. 6A illustrate an example of one embodiment of deferred image loading.
Figure 6B:
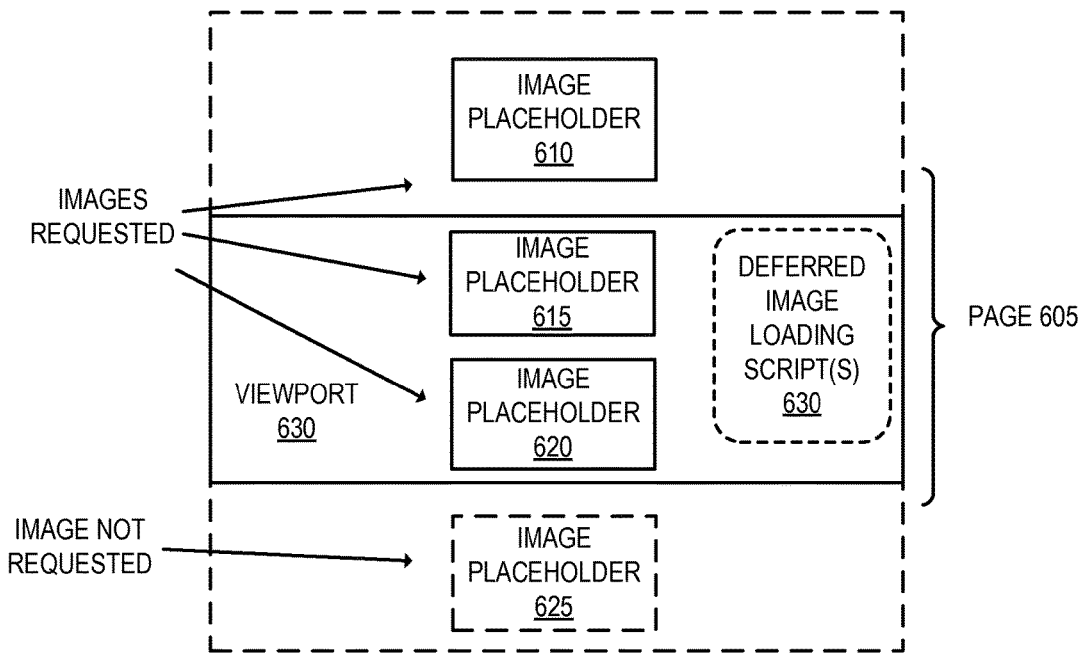
FIG. 6B illustrates the continuation of the example illustrated in FIG. 6A.

FIGS. 6A and 6B illustrate one embodiment of deferred image loading. FIGS. 6A and 6B represents a client device rendering a page 605 (e.g., an HTML page), which the client device has received from a proxy server such as the proxy server 120. The page 605 includes the image placeholders 610, 615, 620, and 625. The page may also include other elements such as text, etc. The page 605 has been modified by the proxy server such that the images of the page 605 will be loaded only when they are in the viewport. For example, the page 605 includes or references the deferred image loading script(s) 630. It should be understood that the deferred image loading script(s) 630 are not displayed. It should also be understood that the deferred image loading example illustrated in FIGS. 6A and 6B is exemplary and other embodiments may load images when they are within a defined distance from the viewport and/or if there is available bandwidth.

The image placeholders 610 and 615 are currently within the viewport 630. Accordingly, the deferred image loading script(s) 630 cause the client network application to request and display the images that correspond to the image placeholders 610 and 615. The image placeholders 620 and 625 are not within the viewport 630. As a result, those corresponding images will not be requested. The image placeholders 620 and 625 are represented with dashed lines to indicate that the corresponding images have not been requested and downloaded.

In FIG. 6B, the user has scrolled down the page 605 such that the image placeholder 620 is now within the viewport 630. Accordingly, the deferred image loading script(s) 630 cause the client network application to request and display the image corresponding to the image placeholder 620. Since the image placeholder 625 is still not within the viewport 630, it will not be requested and displayed.

Auto-Resizing of Images

As previously described, in some embodiments, images are automatically optimized to the size and resolution specific for the page and the requesting device (referred herein as auto-resizing). Auto-resizing of images may be performed independently of the deferred image loading process described herein or in conjunction with the deferred image loading process described herein.

In one embodiment, a set of one or more client-side scripts (these client-side script(s) may share at least some of the functionality of the client-side script(s) for deferred image loading) that are included in the page and/or referenced in the page that includes the reference to the image, cause the client-network application to request a size of that image according to the presented dimensions of the image and/or the size of the viewport of the client device. As an example, these set of client-side scripts are included and/or referenced in the page example.com and cause an image located at example.com/image.gif to be requested with a size based on the presented dimensions of that image and/or the current size of the viewport of the client device.

Figure 7:
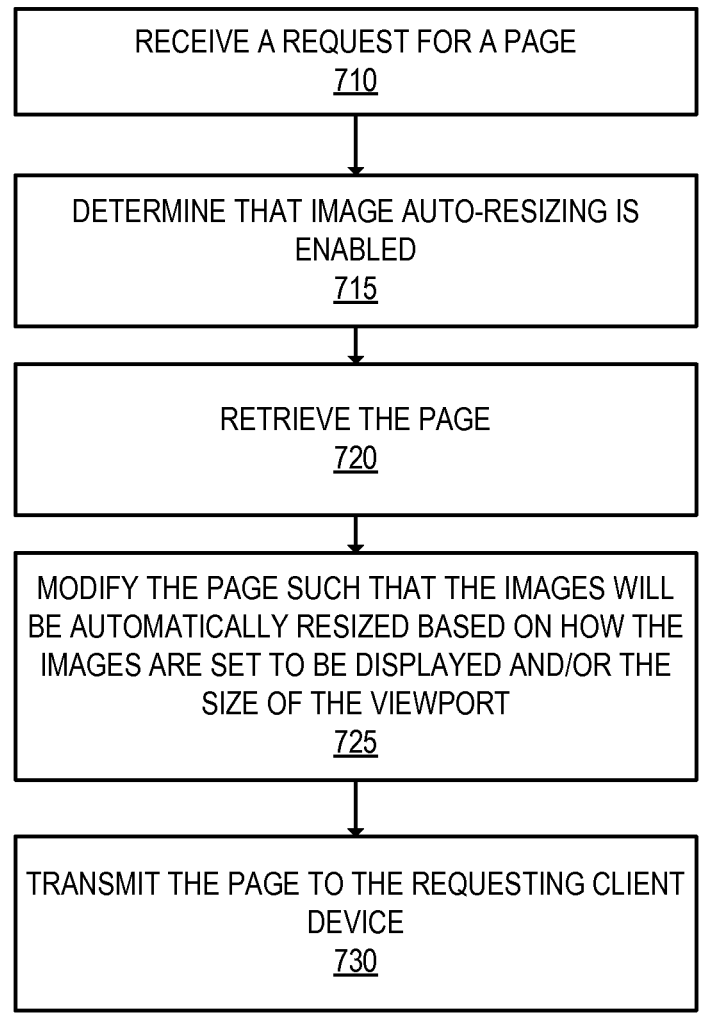
FIG. 7 is a flow diagram that illustrates exemplary operations performed on a proxy server for auto-resizing of images according to one embodiment.

FIG. 7 is a flow diagram that illustrates exemplary operations performed on a proxy server for auto-resizing of images according to one embodiment. At operation 710, a proxy server 120 receives a request for a page (e.g., an HTML page) from a client device. The request may be received as a result of a DNS request for the domain of the page resolving to an IP address of the proxy server 120. Next, at operation 715, the proxy server 120 determines that image auto-resizing is enabled for the requested page. In one embodiment, the proxy server 120 accesses a set of one or more page rules for the domain of the requested page to determine whether image auto-resizing has been enabled. Enabling image auto-resizing will be described in greater detail later herein. In some embodiments the operation of 715 is optional (e.g., the automatic image resizing is applied to every page). Flow then moves to operation 720.

At operation 720, the proxy server 120 retrieves the requested page. If the requested page is available in the proxy server's cache and it has not expired, the proxy server 120 may retrieve the requested page from its cache. The proxy server 120 may also retrieve the requested page from the origin server (e.g., transmit a request to the origin server for the page and receive a response from the origin server that includes the page). Flow then moves to operation 725.

At operation 725, the proxy server 120 modifies the page such that at least some images will be automatically resized based on how those images are used on the page and/or the size of the viewport. For example, the proxy server 120 may modify the code of the page such that when the client network application issues a request for the image, that request will include an indication of a set of one or more requested dimensions for the image. The proxy server 120 may modify the image tags such that they will not (at least initially) be requested by the client network application. In one embodiment, the proxy server 120 may modify the source attribute of the image tags in a similar way as described with respect to FIG. 3. In addition, the proxy server 120 also adds one or more client-side scripts (e.g., JavaScript) and/or references to one or more client-side scripts that, when executed by the client network application, cause the client network application to request the images with dimensions based on how the image is set to be displayed and/or the size of the viewport.

In one embodiment, only those images that are located on the same domain as the requested page may be automatically resized. In another embodiment, only those images that are located on the same domain as the requested page and other domains of customers of the service may be automatically resized. In yet another embodiment, any image, regardless of whether that image is located on a domain of a customer of the service, may be automatically resized.

Flow then moves to operation 730 where the proxy server 120 transmits the modified page to the requesting client device. The proxy server 120 may also store the modified page in its cache such that upon receiving a subsequent request for the page (from the same client device or from a different client device), the proxy server 120 may transmit the modified page to the requesting client device without having to modify the page again.

Figure 8:
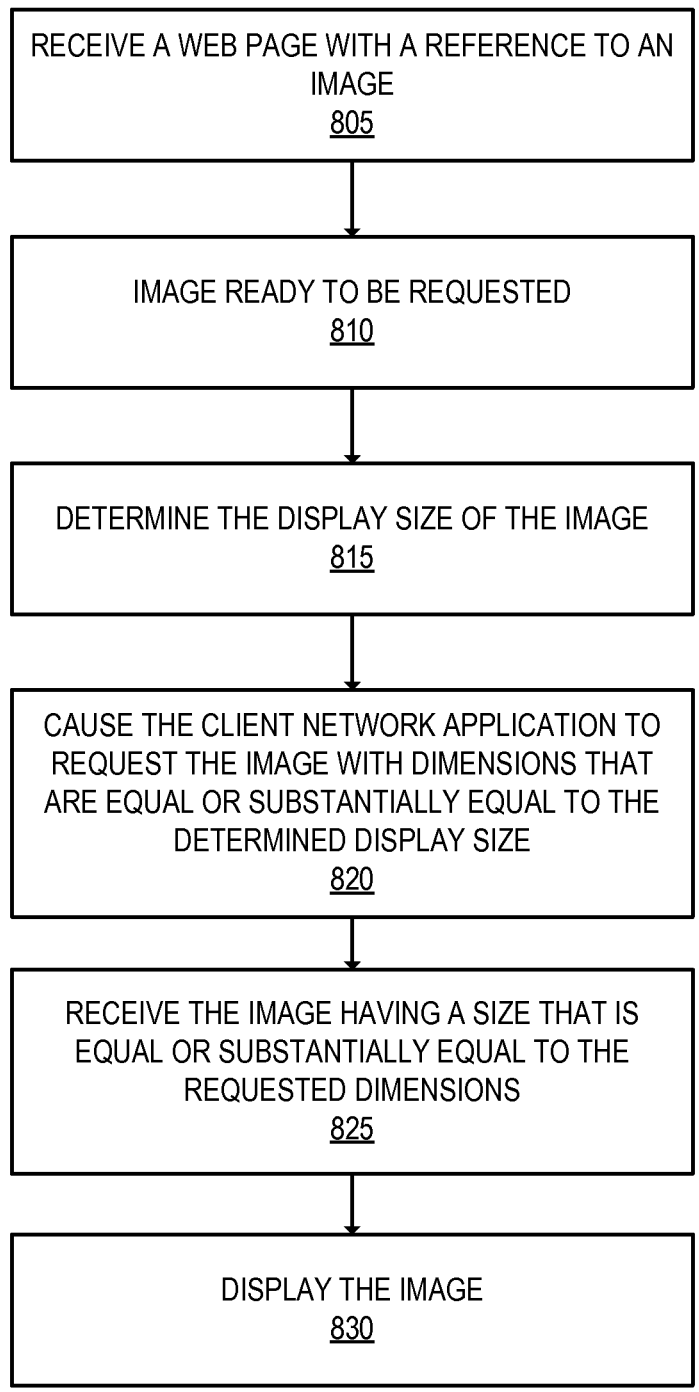
FIG. 8 is a flow diagram that illustrates exemplary operations performed on a client device for causing image(s)

FIG. 8 is a flow diagram that illustrates exemplary operations performed on a client device for causing image(s) referenced in a web page to be requested by the client network application with a set of one or more dimensions according to one embodiment. In one embodiment, the operations described with reference to FIG. 8 are performed at least in part by a set of one or more client-side scripts that are included in the page being rendered by the client network application and/or referenced in the page being rendered by the client network application.

In one embodiment, the operations described with reference to FIG. 8 are performed only for those images that belong to the same domain as the page. For example, if the requested page is example.com, in some embodiments the operations of FIG. 8 are performed only for images of example.com (e.g., example.com/image.gif).

At operation 805, a client network application receives a web page with a reference to an image. For example, the client network application of a client device 110 may receive the web page from a proxy server 120. Next, at operation 810, an image is determined to be ready to be requested. For example, the client network application is ready to make a request for the image. In one embodiment, this request may have been deferred as previously described herein (e.g., the image may be in the viewport or within a defined distance from the viewport).

Next, at operation 815, the set of client-side scripts determine the display size of the image. The display size of the image refers to the displayed dimensions of the image. The set of client-side scripts may determine the display size of the image based on the presented dimensions of the image (how the code of the page is configured to display the image) and/or the size of the viewport of the client network application.

Next, at operation 820, the set of client-side scripts cause the client network application to request the image, where the request includes an indication of one or more requested dimensions for the image that are equal or substantially equal to the determined display size of the image. For example, the set of client-side scripts cause the original URL of the image to be rewritten to include a query string that indicates the requested width and/or height of the image. By way of a specific example, if the determined display size of the image located at www.example.com/image.gif is 960 by 640, the client-side scripts may cause the client network application to request the image at www.example.com/image.gif?_cfgetx=img.rx:960;img.rx:640. This request, which is received by the proxy server, notifies the proxy server of the size of the image that should be returned to the client.

To cause the client network application to request the image, the set of client-side scripts may also rewrite the source attribute to cause the client network application to make a request for the image (e.g., by removing "data-cf" from "data-cfsrc"). If a style attribute for the image was originally included in the HTML (and modified by the proxy server 120), the client-side script rewrites the style attribute according to the original style attribute (e.g., by removing "data-cf" from "data-cfstyle"). The client-side script also removes the null style attribute, which causes the image (if retrieved) to be displayed.

Next, at operation 825, the client network application receives the image, which has a size that is equal or substantially equal to the requested dimensions. For example, the proxy server, upon receiving a request for an image that includes an indication of requested dimensions (e.g., a query string that indicates the width and/or height of the image that is being requested), returns the image with those dimensions or an image that is within a certain range of those dimensions. For example, in one embodiment, the proxy server stores within its cache (e.g., when acting as a CDN), multiple versions of the image, each of which having a different dimension. If there is an image that has the requested dimensions or is within a range of the requested dimensions (e.g., is within X number of pixels of the width and/or Y number of pixels of the height), the proxy server returns that version of the image to the requesting client device. If the proxy server does not have a copy of the image with the requested dimensions or within a range of the requested dimensions, then it will resize the image according to the requested dimensions. It should be understood that the proxy server may issue a request to the origin server for the image if it does not have an image of a suitable size. Next, at operation 830, the client network application displays the image in its corresponding image placeholder.

FIG. 9 is a flow diagram that illustrates exemplary operations performed by a set of one or more client-side scripts for determining the display size of the image according to one embodiment. For example, the operations described with reference to FIG. 9 may be performed during operation 815 described with reference to FIG. 8.

Next, at operation 915, the set of client-side scripts attempt to determine the presented dimensions for the image. The set of client-side scripts may determine the presented dimensions for the image by performing a set of one or more actions. For example, the set of client-side scripts may analyze the image tag to determine whether it has the width and/or height set. As another example, the set of client-side scripts may examine the Cascaded Style Sheets (CSS) style(s) (if one exists) to determine how it is governing the size of the image. Flow then moves to operation 920.

At operation 920, a determination is made whether the presented dimensions for the image were determined. The presented dimensions for the image may not be able to be determined if the width and/or height attributes are not set in the image tag or CSS. If the presented dimensions were not determined, then flow moves to operation 925 where the set of client-side scripts cause the client network application to request the image. If the presented dimensions were determined, then flow moves to operation 930.

At operation 930, the set of client-side scripts determine whether the presented dimensions of the image is larger than the current size of the viewport. In one embodiment, the set of client-side scripts perform a series of checks to determine the size of the viewport (the viewport width and height variables) as previously described herein. If the presented dimensions of the image are larger than the current viewport size, then flow moves to operation 935. If the presented dimensions of the image are smaller or equal to the current viewport size, then flow moves to operation 940. At operation 940, the set of client-side scripts set the display size of the image as the size of the presented dimensions.

At operation 935, the set of client-side scripts set the display size of the image as less than or equal to the size of the viewport. For example, if the size of the viewport of the device is 960 by 640 pixels, but the background image is 2000 pixels wide, the set of client-side scripts may set the display size of the image as having dimensions no greater than 960 by 640.

The proxy server, upon receiving a request for an image that includes a query string that indicates the width and/or height of the image that is being requested, returns the image with those dimensions or an image that is within a certain range of those dimensions. For example, in one embodiment, the proxy server stores within its cache (e.g., when acting as a CDN), multiple versions of the image, each of which having a different dimension. By way of a specific example, the proxy server may store a different version of the image for different known client devices (e.g., a different version for a mobile phone with known display dimensions as compared to a different version for a tablet with known display dimensions). If there is an image that has the requested dimensions or is within a range of the requested dimensions (e.g., is within X number of pixels of the width and/or Y number of pixels of the height), the proxy server returns that version of the image to the requesting client device. If the proxy server does not have a copy of the image with the requested dimensions or within a range of the requested dimensions, then it will resize the image according to the requested dimensions. It should be understood that the proxy server may issue a request to the origin server for the image if it does not have an image of a suitable size.

FIG. 10 is a flow diagram illustrating exemplary operations performed by a proxy server for performing auto-resizing of images according to one embodiment. At operation 1010, the proxy server 120 receives a request for an image, the request indicating a particular width and/or height of the image. For example, the proxy server may receive a request for an image at the following URL example.com/image.gif may be requested with the following URL example.com/image.gif?_cfgetx=img.rx=100;img.ry=100; which requests that the image image.gif should be approximately 100 by 100 pixels. Flow then moves to operation 1015.

At operation 1015, the proxy server determines whether it has a cached version of the requested image with the requested dimensions or optionally within a predefined range (e.g., within X number of pixels of the width (e.g., 50 pixels) and/or within Y number of pixels of the height (e.g., 50 pixels)). If it does, then flow moves to operation 1020 where the proxy server transmits a response to the requesting client device with the retrieved image. If the proxy server does not have a cached version of the requested image with the requested dimensions or optionally within a predefined range, then flow moves to operation 1025 where the proxy server retrieves the image. The proxy server may retrieve the image from the origin server (e.g., by issuing a request to the origin server for the image) if it does not have the image in its cache (if in its cache, the proxy server may retrieve the image from the cache). Flow then moves to operation 1025.

At operation 1025, the proxy server resizes the image according to the requested dimensions. Using the example above, if the original size of the image located at example.com/image.gif is 1000 by 1000 pixels, the proxy server may resize the image to 100 by 100 pixels. Resizing the image typically includes compressing the image while maintaining the aspect ratio of the image. Flow then moves to operation 1030 where the proxy server transmits a response to the requesting client device with the resized image. Flow then moves to operation 1035, where the proxy server stores the resized image in its cache.

Thus, based on how the image is set to be displayed and the size of the viewport, an appropriately sized image will be received and displayed. This saves bandwidth in downloading files that are larger than what will be displayed and reduces the page loading time. This also helps with visitors with limited data plans not saturate their data plan caps (e.g., mobile users). In addition, this may be done without the customer having to change a single line of their HTML code.

Although FIG. 10 illustrates a particular order of operations, it should be understood that such order is exemplary (e.g., alternative embodiments may perform the operations in a different order, combine certain operations, overlap certain operations, etc.). By way of a specific example, FIG. 10 may be augmented by the following. After receiving a request for the image and there is not a version of the image in cache with the requested dimensions or within a predefined range of the requested dimensions, the image may be transmitted to the requesting client device without it being resized. The resizing of the image and storing of the resized image occur as a separate process in the background. This alternative embodiment has the benefit of returning the image quickly to the first visitor (at least the first visitor requesting those specific dimensions of the image) and resizing the image for future visitors that request the image have similar dimensions.

Configuring Deferred Image Loading and/or Image Resizing

In one embodiment, customers of the service (e.g., domain owners and/or personnel working on behalf of domain owners) configure their domain or portion of their domain (e.g., particular page(s) of their domain) for deferred image loading and/or image resizing, without modifying a single line of HTML code. For example, the control servers 125 may provide an interface for the customers to configure the image loading settings for their site (whether deferred image loading and/or image resizing are enabled).

FIG. 11 is an exemplary interface 1110 for the control servers 125 that allows a customer to enable or disable the deferred image loading and/or image auto-resizing functionality described herein, according to one embodiment. In one embodiment, the interface 1110 is available over the Internet as a website. However, in other embodiments, the functionality of the interface 1110 may be provided through a mobile application interface. The toggle button 1115 allows the customer to enable or disable auto-resizing of images. The toggle button 1120 allows the customer to enable or disable deferred loading of images. Upon making a change to the image loading settings, the control servers 125 update the proxy servers 120 with the updated image loading settings. For example, upon enabling the deferred image loading, the proxy server(s) 120 that receive requests for the customer's pages will insert the set of client-side script(s) and/or references to the set of client-side script(s) that provide the functionality of the deferred image loading. Upon enabling the image auto-resizing, the proxy server(s) 120 that receive requests for the customer's pages will insert the set of client-side script(s) and/or references to the set of client-side script(s) that provide the functionality of the image auto-resizing.

Minimizing the Number of Requests for Images

In one embodiment, if the image request reduction loading optimization is enabled for the requested network resource (or enabled for the domain of the requested network resource), the proxy server 120 modifies the page such that the number of requests for images of the page is reduced. In one embodiment, the number of requests is reduced by grouping multiple, different requests for images, into a single request (known herein as a bulk request) (e.g., a single HTTP request). For example, the image manager (a set of one or more client-side scripts executed by the client network application) may create a single canonical URL that represents multiple images of the page that are to be sent back in a response. This single URL may be created by combining the individual URLs for all images into a single string and appending them to the query parameters of the single request (typically in URL-encoding). FIG. 14 illustrates a single URL that may be created by the image manager for requesting multiple images in a single request. As illustrated in FIG. 14, the single URL includes multiple images of the page (example.com/1.png, example.com/2.png, and example.com/3.png) and is formatted using URL-encoding. Although FIG. 14 illustrates the single URL including images from the same domain (example.com), in some embodiments the single URL may include images from multiple domains.

The bulk request may be transmitted to the proxy server 120, which receives and decodes the bulk request and attempts to retrieve the images indicated in the bulk request. The proxy server 120 may retrieve the images from its cache if available and not expired or alternatively may issue requests for the images to the appropriate origin servers.

After retrieving the images requested in the bulk request, in one embodiment the proxy server 120 transmits a bulk response to the requesting client device that includes the images requested in the bulk request (at least those images in which the proxy server 120 was successful in retrieving). In one embodiment, the proxy server 120 ensures that the encoding of each image is in the same format, which may require re-encoding an image into that common format if it is not already in that format. By way of example, the proxy server 120 may ensure that each image is in the Portable Network Graphics (PNG) format. FIG. 15 illustrates an exemplary format for bulk image responses according to one embodiment.

In another embodiment, after retrieving the images requested in the bulk request, the proxy server 120 transmits the responses to the requesting device one image at a time (not though a bulk response).

FIG. 16 illustrates an exemplary implementation of image request reduction according to one embodiment. The client device 110A transmits a request 1610 for example1.com/index.html, which is received by the proxy server 120. The request 1610 may be received as a result of a DNS request for example1.com resolving to an IP address of the proxy server 120. The proxy server 120 retrieves the requested resource. In one embodiment, if the requested resource is in cache and has not expired, the proxy server 120 retrieves the requested resource from its cache. However, if the requested resource is not in cache or has expired, the proxy server 120 issues a request 1615 to the origin server 130A, which serves the requested resource. The proxy server 120 receives the response 1620 from the origin server 130A which includes the requested resource. The requested resource includes multiple images, some of which are sourced at the domain example1.com and some which are sourced at the domain example2.com. For example, the image tags 1622 and 1624 are for images sourced at the domain example1.com (e.g., example1.com/1.png and example2.com/2.png) and the image tag 1626 is for an image sourced at the domain example2.com (e.g., example2.com/1.png).

The proxy server 120 modifies the HTML for image loading optimization at operation 1625. As described above, in one embodiment the proxy server 120 neutralizes the images included in the requested resource. For example, the image tags 1622, 1624, and 1626 are neutralized into the neutralized image tags 1640, 1642, and 1644 respectively, such that the client device 110A will not request the corresponding images (at least initially). The proxy server 120 also adds the image manager 1635, which is a set of one or more client-side scripts and/or a set of one or more references to client-side scripts that, when executed by the client network application of the client device 110A, will, among other actions, cause the number of requests for images included in the response to be reduced. By way of a specific example, the image manager 1635, when executed, will cause the client network application of the client device 110A to create a bulk request for the images included in the requested resource. The proxy server 120 transmits the modified page to the requesting client device 110A in the response 1630.

The client device 110A loads the image manager at operation 1650. The image manager 1650 scans the DOM for all image tags that have been neutralized and registers them for eventual loading. When appropriate, the image manager interfaces with localStorage to retrieve stored degraded versions of images (if available), which will be described with greater detail later herein. LocalStorage (sometimes referred to as HTML5 Storage), is storage that is locally available on the client device, persistent, and can be accessed by code executing by the client network application in certain circumstances.

The image manager 1635 causes the bulk image request 1655 to be transmitted to the proxy server 120. The bulk image request 1655 is a single request that indicates multiple requests for multiple images (namely example1.com/1.png, example1.com/2.png, and example2.com/1.png). In one embodiment, the bulk image request 1655 is communicated to the proxy server 120 through a single URL that represents multiple images of the page that are to be sent back into the response.

The proxy server 120 receives and decodes the bulk image request 1655 to determine the individual images being requested and their location. The proxy server 120 then retrieves the images indicated in the bulk image request 1655. The proxy server 120 may receive the images from its cache if available and not expired. Alternatively the proxy server 120 may issue requests for the images to the appropriate origin servers. As illustrated in FIG. 16, the proxy server 120 issues requests for the images and receives responses with the images from the origin servers 130A-B. In particular, there is a request/response pair 1660 between the proxy server 120 and the origin server 130A to retrieve the image located at example1.com/1.png, a request/response pair 1665 between the proxy server 120 and the origin server 130A to retrieve the image located at example1.com/1.png, and there is a request/response pair 1670 between the proxy server 120 and the origin server 130B to retrieve the image located at example2.com/1.png.

After receiving the images, the proxy server 120 returns them to the client device 110A in one or more responses. The proxy server 120 may also cache the images so that it may locally retrieve them for subsequent request. In one embodiment, the proxy server 120 returns the images to the client device 110A in a bulk response. In another embodiment, the proxy server 120 returns the images to the client device 110 in multiple responses (e.g., a different response for each different image being returned). As illustrated in FIG. 16, the proxy server 120 creates and transmits the bulk image response 1675 to the client device 110A, which includes the requested images.

In one embodiment, the proxy server 120 does not wait until each image is retrieved prior to transmitting them in the bulk image response 1675. The images may begin to stream back to the client device 110A as they are retrieved, which may or may not be in the order in which they are requested. For example, the images may be transferred to the client device 110A as binary data and parsed by the client using client-side scripting (e.g., JavaScript) typed containers (this functionality is also known as Typed Arrays). Not all client network applications currently support Typed Arrays. In one embodiment, the image manager 1635 when executed by the client network application of client device 110A, determines whether the client network application supports Typed Arrays. For example, the image manager 1635 may execute the following function to determine whether the client network application supports Typed Arrays:

function supportsTypedArrays( ){return typeof
window.ArrayBuffer!=='undefined';}

The image manager 1635 may cause an indication to be transmitted to the proxy server 120 of whether the client network application of the client device 110A supports Typed Arrays.

In one embodiment, a DOM Blob API is used to convert the binary representation of an image into a displayable object in the DOM. A Blob object represents a file-like object of immutable raw data. A Blob is created using the binary representation of each image, which is then converted into a displayable object using URL.createObjectURL. In one embodiment, the image manager 1635, when executed by the client network application of client device 110A, determines whether the client network application supports DOM Blobs. For example, the image manager 1635 may execute the following function to determine whether the client network application supports DOM Blobs:

function supportsDOMBlobs( ) {
    return typeof window.Blob !== 'undefined' ||
        typeof window.BlobBuilder !== 'undefined'; }

Although FIG. 16 illustrates the same type of image being requested and returned (PNG images), it should be understood that there can be many different types of images being requested and embodiments are not limited to a specific type of image. In some embodiments, the proxy server 120 ensures that each image is in the same format, which may involve re-encoding an image into that format if it is not already in that format.

Progressive Enhancement

In one embodiment, if the progressive enhancement image loading optimization is enabled for the requested network resource (or enabled for the domain of the requested network resource), the proxy server 120 modifies the page such that degraded versions of images may precede their full quality counterparts. By way of example, with reference to FIG. 16, the proxy server 120 may transmit degraded versions of the requested images in the bulk image response 1675. Since images are critical to the final layout and display of most web pages, progressive enhancement allows degraded versions of images to precede their full-quality counterparts for the benefit of faster rendering while maintaining a consistent layout. The degraded images (e.g., a compressed version of the full-quality counterparts) will be of a smaller file size which will be able to be quickly returned and displayed by the requesting client device. A number of techniques may be used to reduce the image file size including removing color information, lowering quality level, and/or pixel-level filtering.

In one embodiment and if the client network application supports localStorage (typically HTML5 compliant client network applications support localStorage), the degraded images are cached in the localStorage to further minimize outbound requests. The degraded image data can be referenced by the image manager and the applied to the neutralized images in order to create a degraded presentation to the end user (potentially avoiding network requests when presenting the degraded images to the end user). In one embodiment, the size of the images are reduced such that they will fit within the limited capacity of the localStorage of the client network application (the original size of the image is also transmitted to the client network application so that the client can scale each image appropriately).

In addition to or in lieu of storing the degraded images on the client (e.g., in localStorage), a manifest can be kept of the images (the non-degraded versions) that are likely to be available in cache. This manifest (referred to as the cache manifest), can be stored on the client (e.g., in localStorage) and used to decide to not preload images in a degraded form that are likely to be in cache for subsequent page views. In one embodiment, the manifest is in JavaScript Object Notation (JSON) format.

In one embodiment, the image manager, when executed by the client network application, determines whether the client network application supports WebWorkers, which is a JavaScript API for concurrent execution. If WebWorkers is not supported by the client network application, a polyfill may be used instead. In one embodiment, the image manager may execute the following function to determine whether the client network application supports WebWorkers:

```
function supportsWebWorkers( ){return typeof
    window.Worker!=='undefined';}
```

After receiving the degraded image data and knowing the size of the image in its raw format (full quality counterpart), the client network application can render that image at the appropriate scale. For example, if supported by the client network application, it may use the HTML5 Canvas 2D API and assign the resulting image data to the previously neutralized image. The image manager may determine whether the HTML5 Canvas 2D API is supported by the client network application. In one embodiment, the image manager may execute the following function to determine whether the client network application supports HTML5 Canvas 2D API:

```
function supportsCanvas2D( ) {
    var canvas = document.createElement('canvas');
    if (typeof canvas.getContext === 'undefined') {
        return false; }
    try {
        var context = canvas.getContext('2d');
    } catch(e) {
        return false;
    }
    return !!context;
}
```

In one embodiment, Data URLs are used as the final format when representing degraded images since the Canvas 2D API can export its contents as a Data URL. Data URLs can also be used as a fallback in the case that the client network application does not support Typed Arrays, WebWorkers, Dom Blobs, or the Canvas 2D API since the Data URLs can be created on the proxy server and streamed directly to the requesting client device.

After degraded images are displayed to the user and loading is complete (e.g., the 'onload' event has fired), their full quality counterparts may be requested and displayed asynchronously. In one embodiment, their full quality counterparts are only requested if their corresponding image placeholders are in the viewport (or in some embodiments in close proximity to the viewport), or as there are spare network resources available.

FIG. 17 is a flow diagram that illustrates exemplary operations for optimizing image loading according to one embodiment. Although not illustrated in FIG. 17, prior to the operations of FIG. 17 the client device has requested a resource and received a response that has been modified for optimized image loading. For example, the image tags of the response have been neutralized and the response includes an image manager as previously described herein.

At operation 1710, a determination is made whether the client network application is on a mobile device. For example, the image manager may use jQuery or other techniques to determine the type of client network application (e.g., whether the client network application is a browser typically seen on mobile devices or a browser typically employed on desktop devices). If the client network application is not on the mobile device (e.g., a desktop device received the response), then flow moves to operation 1715 and deferred image loading of the images on the page is performed as previously described herein. If the client network application is on a mobile device, then flow moves to operation 1720.

At operation 1720, a determination is made whether the mobile device is connecting through a mobile operator network (e.g., 2G, 3G). Bandwidth is typically limited on mobile operator networks and latency may be high (as opposed to wired or WiFi networks where bandwidth and latency are usually less of a concern). In one embodiment, the image manger determines the connection of the requesting client device by examining the navigator property, which some mobile browsers use to reveal information relating to the connection. If the connection is determined to be over a mobile operator network, then flow moves to operation 1730. If the connection is not determined to be over a mobile operator network or it cannot be determined whether the connection is over the mobile operator network (e.g., the navigator property is not used or it is otherwise not possible to detect the connection on the device), then flow moves to operation 1725.

At operation 1725, a determination is made whether one or more benchmarks suggest that latency is high. In one embodiment, the image manager executes a set of one or more tests to determine the latency. For example, the image manager may approximate a measurement of overhead by timing and analyzing a request for a single resource of known size that is guaranteed not to be in the cache of the client network application (e.g., a random file name or wildcard domain may be used). This resource is typically a small file that is not visible to the user. The time taken to load the image can be used an approximation for connection latency. If the benchmark(s) suggest that the latency is high, then flow moves to operation 1730, otherwise flow moves to operation 1715.

At operation 1730, a determination is made for each of the images included in the page whether that image is likely to be available in cache (the non-degraded version of the image). For example, the image manager may access the cache manifest (e.g., stored in localStorage) to determine whether each image is represented on the cache manifest and thus likely to be available in cache. If an image is likely to be available in cache, then flow moves to operation 1740 where that image is removed from the list of images to be preloaded in a degraded form and flow then moves to operation 1735. If the image is not likely to be available in cache, then flow moves to operation 1735.

At operation 1735, a determination is made for each of the images that are not likely to be available in cache whether there is a degraded version of that image in localStorage. For those images that do not have a degraded version stored in localStorage, flow moves to operation 1745 and those images are requested in bulk form, and then operation moves to operation 1750. For example, the image manager creates a single request that represents each image on the page that is not likely to be in cache or does not have a degraded version stored in localStorage. For example, a single canonical URL may be created combining the individual URLs for each of these images. By way of example, the request may be transmitted to the proxy server described herein. If each image is likely to be in cache or there is a degraded version of each image stored in localStorage, then flow moves to operation 1750.

After transmitting the bulk request for images in operation 1745, the client device will typically begin to receive the requested images in a degraded form. For example, the images may be received at the client device as binary data and parsed by the client using client-side scripting (e.g., JavaScript) typed containers if supported.

At operation 1750, a determination is made whether the 'onload' event has fired yet. If the 'onload' event has not fired, then flow moves to operation 1755 and the image manager assigns the degraded image data to the neutralized image tags. As previously described, the image manager may use a number of techniques including use of WebWorkers, DOM Blobs, Canvas 2D, and/or Data URLs to cause the degraded image data to be displayed, depending on the capabilities of the client network application. Flow moves from operation 1755 back to operation 1750 to wait for the 'onload' event to fire. After the 'onload' event has fired, then flow moves to operation 1715.

As illustrated in FIG. 18, the computer system 1800, which is a form of a data processing system, includes the bus(es) 1850 which is coupled with the processing system 1820, power supply 1825, memory 1830, and the nonvolatile memory 1840 (e.g., a hard drive, flash memory, Phase-Change Memory (PCM), etc.). The bus(es) 1850 may be connected to each other through various bridges, controllers, and/or adapters as is well known in the art. The processing system 1820 may retrieve instruction(s) from the memory 1830 and/or the nonvolatile memory 1840, and execute the instructions to perform operations described herein. The bus 1850 interconnects the above components together and also interconnects those components to the display controller & display device 1870, Input/Output devices 1880 (e.g., NIC (Network Interface Card), a cursor control (e.g., mouse, touchscreen, touchpad, etc.), a keyboard, etc.), and the optional wireless transceiver(s) 1890 (e.g., Bluetooth, WiFi, Infrared, etc.). In one embodiment, the client devices 110A-I, the control server(s) 125, the proxy server(s) 120, and/or the origin servers 130A-N can take the form of the computer system 1800.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for automatically optimizing the loading of images of a web page, the method comprising:
   receiving a request for the web page, the request originating from a client network application of a client device, the web page including a plurality of references to a plurality of images respectively;
   retrieving the requested web page;
   modifying the retrieved web page including,
      modifying code of the retrieved web page such that the client network application will not, for each one of the plurality of images, initially request those images when parsing the web page, and
      adding code to the retrieved web page that, when executed by the client network application, cause at least two of the plurality of images to be requested with a single request;
   transmitting the modified web page to the client device;
   receiving, from the client network application of the client device, a single request for at least two of the images referenced in the web page;
   retrieving the at least two of the images;
   degrading the retrieved at least two of the images to reduce the file size of the at least two of the images;
   transmitting the degraded at least two of the images to the client device;
   receiving, from the client network application of the client device, a request for one of the degraded at least two of the images in a full-quality version of that image;
   responsive to receiving the request for one of the degraded at least two of the images in a full-quality version of that image, retrieving that requested image, wherein the retrieved image is a full-quality version of the image; and
   transmitting the full-quality version of the image to the client device.

2. The method of claim 1, further comprising:
   wherein the at least two of the images are different types; and
   encoding at least one of the at least two images such that all of the at least two images are of a same type.

3. The method of claim 1, wherein the at least two images are sourced at different domains.

4. The method of claim 1, wherein transmitting the degraded at least two of the images to the client device is performed using a single response transmitted to the client device.

5. The method of claim 1, wherein the added code includes a set of one or more client-side scripts and/or a set of one or more references to one or more client-side scripts that, when executed by the client network application, cause the at least two of the plurality of images to be requested with the single request.

6. A method in a client device for automatically optimizing the loading of images of a web page while rendering the web page, the method comprising:
   receiving a web page that includes a plurality of references to a plurality of images respectively, wherein the plurality of references have been modified such that the plurality of images will not be initially requested, and wherein the web page also includes code to optimize the loading of the plurality of images;

executing the code to optimize the loading of the plurality of images, wherein executing the code causes a single request for at least two of the plurality of images to be generated and transmitted;
in response to transmitted single request, receiving degraded versions of the at least two of the plurality of images;
displaying the received degraded versions of the at least two of the plurality of images in their respective appropriate locations;
after the web page is finished loading, transmitting requests for full quality versions of those images that were displayed in degraded form; and
for each full quality version of those images that are received in response to the requests, replacing the degraded version of that image with its full quality version counterpart.

7. The method of claim 6, wherein executing the code to optimize the loading of the plurality of images further causes the following:
determining whether each one of the plurality of images is locally available to the client device either in their full quality version or in a degraded version, wherein the at least two of the plurality of images that are transmitted are not locally available to the client device;
for each one of the plurality of images that is locally available to the client device in its degraded version, displaying those degraded versions in their appropriate locations of the page.

8. The method of claim 6, wherein only those ones of the images that have a reference whose location in the web page where the corresponding image is to be displayed is within a viewport of the client network application or within a defined distance from the viewport are requested in their full quality versions.

9. A non-transitory machine-readable storage medium that provides instructions that, when executed by a processor, cause the processor to perform operations comprising:
receiving a request for a web page, the request originating from a client network application of a client device, the web page including a plurality of references to a plurality of images respectively;
retrieving the requested web page;
modifying the retrieved web page including,
modifying code of the retrieved web page such that the client network application will not, for each one of the plurality of images, initially request those images when parsing the web page, and
adding code to the retrieved web page that, when executed by the client network application, cause at least two of the plurality of images to be requested with a single request;
transmitting the modified web page to the client device;
receiving, from the client network application of the client device, a single request for at least two of the images referenced in the web page;
retrieving the at least two of the images;
degrading the retrieved at least two of the images to reduce the file size of the at least two of the images;
transmitting the degraded at least two of the images to the client device;
receiving, from the client network application of the client device, a request for one of the degraded at least two of the images in a full-quality version of that image;
responsive to receiving the request for one of the degraded at least two of the images in a full-quality version of that image, retrieving that requested image, wherein the retrieved image is a full-quality version of the image; and
transmitting the full-quality version of the image to the client device.

10. The non-transitory machine-readable storage medium of claim 9, wherein the medium further provides instructions that, when executed by the processor, cause the processor to perform the following operations:
wherein the at least two of the images are different types; and
encoding at least one of the at least two images such that all of the at least two images are of a same type.

11. The non-transitory machine-readable storage medium of claim 9, wherein the at least two images are sourced at different domains.

12. The non-transitory machine-readable storage medium of claim 9, wherein transmitting the degraded at least two of the images to the client device is performed using a single response transmitted to the client device.

13. The non-transitory machine-readable storage medium of claim 9, wherein the added code includes a set of one or more client-side scripts and/or a set of one or more references to one or more client-side scripts that, when executed by the client network application, cause the at least two of the plurality of images to be requested with the single request.

14. A non-transitory machine-readable storage medium that provides instructions that, when executed by a processor, cause the processor to perform operations comprising:
receiving a web page that includes a plurality of references to a plurality of images respectively, wherein the plurality of references have been modified such that the plurality of images will not be initially requested, and wherein the web page also includes code to optimize the loading of the plurality of images;
executing the code to optimize the loading of the plurality of images, wherein executing the code causes a single request for at least two of the plurality of images to be generated and transmitted;
in response to transmitted single request, receiving degraded versions of the at least two of the plurality of images;
displaying the received degraded versions of the at least two of the plurality of images in their respective appropriate locations;
after the web page is finished loading, transmitting requests for full quality versions of those images that were displayed in degraded form; and
for each full quality version of those images that are received in response to the requests, replacing the degraded version of that image with its full quality version counterpart.

15. The non-transitory machine-readable storage medium of claim 14, wherein executing the code to optimize the loading of the plurality of images further causes the following:
determining whether each one of the plurality of images is locally available to the client device either in their full quality version or in a degraded version, wherein the at least two of the plurality of images that are transmitted are not locally available to the client device;
for each one of the plurality of images that is locally available to the client device in its degraded version, displaying those degraded versions in their appropriate locations of the page.

16. The non-transitory machine-readable storage medium of claim 14, wherein only those ones of the images that have a reference whose location in the web page where the corresponding image is to be displayed is within a viewport of the client network application or within a defined distance from the viewport are requested in their full quality versions.

17. The method of claim 1, wherein the degraded at least two of the images to the client device are transmitted as they are retrieved and degraded without waiting until each of the at least two images have been retrieved and degraded.

18. The method of claim 6, wherein the degraded versions of the at least two of the plurality of images are received in any order.

19. The non-transitory machine-readable storage medium of claim 9, wherein the degraded at least two of the images to the client device are transmitted as they are retrieved and degraded without waiting until each of the at least two images have been retrieved and degraded.

20. The non-transitory machine-readable storage medium of claim 14, wherein the degraded versions of the at least two of the plurality of images are received in any order.

21. The method of claim 1, wherein the modifying code of the retrieved web page such that the client network application will not, for each one of the plurality of images, initially request those images when parsing the web page, includes:
    modifying an image tag of each one of the plurality of images so they will not be initially requested by the client network application.

22. The non-transitory machine-readable storage medium of claim 9, wherein the modifying code of the retrieved web page such that the client network application will not, for each one of the plurality of images, initially request those images when parsing the web page, includes:
    modifying an image tag of each one of the plurality of images so they will not be initially requested by the client network application.

* * * * *